US012559424B2

(12) United States Patent
Ashraf et al.

(10) Patent No.: US 12,559,424 B2
(45) Date of Patent: Feb. 24, 2026

(54) CEMENT COMPOSITIONS, AND METHODS THEREOF

(71) Applicant: University of Maine System Board of Trustees, Orono, ME (US)

(72) Inventors: Warda Bint Ashraf, Arlington, TX (US); Hemant Purushottam Pendse, Orono, ME (US); Muhammad Intesarul Haque, Arlington, TX (US)

(73) Assignee: University of Maine System Board of Trustees, Orono, ME (US)

( * ) Notice: Subject to any disclaimer, the term of this patent is extended or adjusted under 35 U.S.C. 154(b) by 304 days.

(21) Appl. No.: 18/281,476

(22) PCT Filed: Mar. 11, 2022

(86) PCT No.: PCT/US2022/019907
§ 371 (c)(1),
(2) Date: Sep. 11, 2023

(87) PCT Pub. No.: WO2022/192642
PCT Pub. Date: Sep. 15, 2022

(65) Prior Publication Data
US 2024/0158296 A1 May 16, 2024

Related U.S. Application Data

(60) Provisional application No. 63/160,397, filed on Mar. 12, 2021.

(51) Int. Cl.
*C04B 20/10* (2006.01)
*C04B 18/10* (2006.01)
(Continued)

(52) U.S. Cl.
CPC ........ *C04B 20/1022* (2013.01); *C04B 18/101* (2013.01); *C04B 28/04* (2013.01);
(Continued)

(58) Field of Classification Search
CPC ... C04B 20/1022; C04B 18/101; C04B 28/04; C04B 40/0046; C04B 2103/65;
(Continued)

(56) References Cited

U.S. PATENT DOCUMENTS

2019/0084879 A1* 3/2019 Pilz .................... C04B 20/1051
2019/0345061 A1 11/2019 Ofori-Boadu et al.
2020/0062646 A1 2/2020 Ng et al.

FOREIGN PATENT DOCUMENTS

CN 105330220 A 2/2016
CN 108623248 A * 10/2018 ............. C04B 38/08
(Continued)

OTHER PUBLICATIONS

CN108623248A Machine Translation (Year: 2018).*
(Continued)

*Primary Examiner* — Pamela H Weiss
(74) *Attorney, Agent, or Firm* — Choate, Hall & Stewart LLP; Brian E. Reese; Samuel R. Polio

(57) ABSTRACT

The present disclosure provides compositions comprising modified biochar and a cement composition, as well as methods of making and characterizing such compositions, and/or technologies relating to such compositions, their production, and/or their use.

16 Claims, 14 Drawing Sheets

(51) Int. Cl.

| | | |
|---|---|---|
| *C04B 28/04* | (2006.01) | |
| *C04B 40/00* | (2006.01) | |
| *C04B 103/65* | (2006.01) | |
| *C04B 111/27* | (2006.01) | |
| *C04B 111/94* | (2006.01) | |

(52) U.S. Cl.
CPC ...... *C04B 40/0046* (2013.01); *C04B 2103/65* (2013.01); *C04B 2111/27* (2013.01); *C04B 2111/94* (2013.01)

(58) Field of Classification Search
CPC ............. C04B 2111/27; C04B 2111/94; C04B 40/0039; C04B 28/02; C04B 14/022; C04B 20/008; C04B 24/08; Y02W 30/91
See application file for complete search history.

(56) References Cited

FOREIGN PATENT DOCUMENTS

| CN | 110786328 | A | | 2/2020 | | |
|---|---|---|---|---|---|---|
| JP | 2007076924 | A | | 3/2007 | | |
| JP | 2022016828 | A | | 1/2022 | | |
| JP | 2022-532901 | A | | 7/2022 | | |
| WO | WO-8204271 | A1 | * | 12/1982 | ............. | C04B 18/24 |
| WO | WO-0190023 | A2 | * | 11/2001 | ............. | C04B 24/08 |
| WO | WO-2015185885 | A1 | * | 12/2015 | ............. | C04B 28/02 |
| WO | WO-2021/003012 | A1 | | 1/2021 | | |
| WO | WO-2022/192642 | A1 | | 9/2022 | | |

OTHER PUBLICATIONS

Belli, A. et al., Evaluating the Self-Sensing Ability of Cement Mortars Manufactured with Graphene Nanoplatelets, Virgin or Recycled Carbon Fibers through Piezoresistivity Tests, Sustainability, 10:1-12 (2018).

Haque et al. Production of sustainable, low-permeable and self-sensing cementitious composites using biochar, Sustainable Materials and Technologies, 28(e00279):1-12 (2021).

Haque et al. Utilization of Biochar as a Multifunctional Additive in Cement-Based Materials, Proceedings of the 3rd RILEM Spring Convention and Conference (RSCC 2020), 343-353 (2021).

International Search Report for PCT/US22/19907, 10 pages (mailed May 20, 2022).

Muthukrishnan et al. Application of rice husk biochar and thermally treated low silica rice husk ash to improve physical properties of cement mortar, Theoretical and Applied Fracture Mechanics, 104:1-43 (2019).

Rajabipour, F. et al., Electrical conductivity of drying cement paste, Mater Struct., 40:1143-1160 (2007).

Winsley, P., Biochar and bioenergy production for climate change mitigation, New Zealand Science Review, 64(1):5-10 (2007).

Written Opinion for PCT/US22/19907, 7 pages (mailed May 20, 2022).

Maljaee, H. et al., Incorporation of biochar in cementitious materials: A roadmap of biochar selection, ScienceDirect, 283:122757 (2021).

Sidharth, R. et al., Developing carbon nanoparticles with tunable morphology and surface chemistry for use in construction, Construction & Building Materials, Elsevier Ltd, 262 (2020).

Zhong, Y. et al., Sulfonic acid functionalized hydrophobic mesoporous biochar: Design, preparation and acid-catalytic properties, Fuel, 240:270-277 (2018).

* cited by examiner

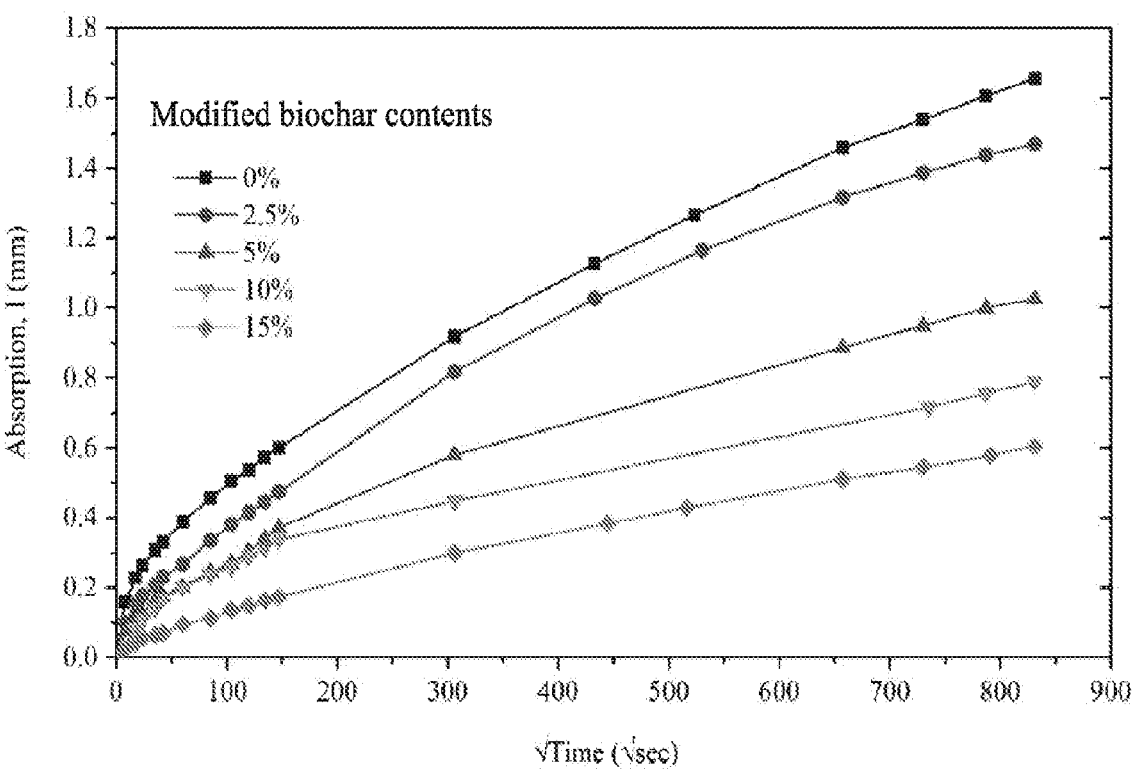
FIG. 11A
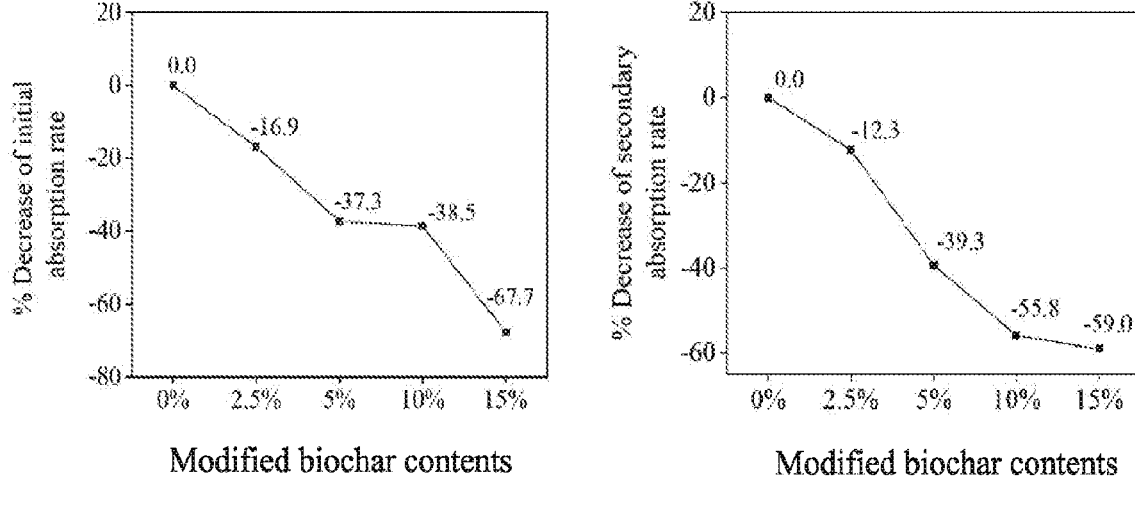
FIG. 11B                                     FIG. 11C

CEMENT COMPOSITIONS, AND METHODS THEREOF

CROSS-REFERENCE TO RELATED APPLICATIONS

This application is a 371 National Stage entry of International Application No. PCT/US22/19907 filed on Mar. 11, 2022, which claims priority to and benefit of U.S. Provisional Application No. 63/160,397 filed on Mar. 12, 2021, the disclosures of each of which are hereby incorporated by reference in their entireties.

GOVERNMENTAL RIGHTS

This invention was made with government support under contract number SP4701-18-C-0047 awarded by Defense Logistics Agency (DLA). The government has certain rights in the invention.

BACKGROUND

A cement is a binder, a substance used for construction that sets, hardens, and adheres to other materials to bind them together. Cement is typically mixed with sand and gravel (aggregate) together. Cement mixed with fine aggregate produces mortar for masonry, or with sand and gravel, produces concrete. Concrete is one of the most widely used materials.

SUMMARY

The present disclosure provides compositions comprising a cement composition and biochar as well as method of making and using such compositions; the present disclosure also provides various technologies for making, using, and/or characterizing such compositions.

Among other things, the present disclosure identifies the source of at least one problem in certain compositions comprising a cement composition. Alternatively or additionally, according to various embodiments, provided technologies display certain advantages and/or solve one or more problems associated with prior technologies.

In some embodiments, the present disclosure provides technologies for improving certain properties of biochar and/or compositions comprising biochar. In some embodiments, compositions comprising biochar (e.g., cement composition(s) comprising biochar) in accordance with the present disclosure exhibit high hydrophobicity (e.g., relative to a cement composition that does not comprise biochar). Among other things, the present disclosure provides technologies that may be particularly suitable and/or may offer particular advantages for reducing chemical and physical degradation processes of compositions, e.g., by reducing water absorption.

In some embodiments, compositions comprising biochar in accordance with the present disclosure exhibit high conductivity (e.g., relative to a cement composition that does not comprise biochar). Among other things, therefore, the present disclosure provides technologies that may be particularly suitable and/or may offer particular advantages, for use in real-time monitoring of stress-strains in the compositions, e.g., by measuring electrical resistance measurements.

In one aspect, the present disclosure provides compositions comprising at least one cement composition; and a modified biochar comprising a biochar and a hydrophobic agent (e.g., more hydrophobic than the biochar).

In some embodiments, the modified biochar is more hydrophobic than the biochar.

In some embodiments, the composition is piezoresistive (e.g., characterized in that the composition has a linear correlation between an applied stress and a change in resistivity).

In some embodiments, the composition comprises the modified biochar within a range of 1 weight % to 30 weight % of a combination of the cement composition and the modified biochar.

In some embodiments, the hydrophobic agent is selected from the group consisting of steacric acid, oleic acid, myristic acid and combinations thereof.

In some embodiments, a mass ratio of the hydrophobic agent to the biochar is within a range of about 1:100 to 1:10.

In some embodiments, the composition further comprises water.

In some embodiments, a mass ratio of the water to a combination of the cement composition and the modified biochar is about 0.25 to 0.8.

In some embodiments, the composition further comprises a fine aggregate.

In some embodiments, a mass ratio of a combination of the cement composition and the modified biochar to the fine aggregate is about 2 to 3.

In some embodiments, the composition has a compressive strength lower (e.g., about 1% to 25% lower) than the cement composition (or a composition comprising the cement composition but not the modified biochar).

In some embodiments, the composition has a flexural strength lower (e.g., about 1% to 20% lower) than the cement composition (or a composition comprising the cement composition but not the modified biochar).

In some embodiments, the composition has a heat release (e.g., per gram of the cement composition) higher (e.g., about 1% to 20% higher) than the cement composition (or a composition comprising the cement composition but not the modified biochar).

In some embodiments, the composition comprises chemically bound water less (e.g., about 1% to 10% less) than the cement composition (or a composition comprising the cement composition but not the modified biochar) (e.g., per gram of the cement composition).

In some embodiments, the composition comprises less $Ca(OH)_2$ (e.g., about 1% to 50% less) than the cement composition (or a composition comprising the cement composition but not the modified biochar).

In some embodiments, the composition has a flow index lower (e.g., about 1% to 95% lower) than the cement composition (or a composition comprising the cement composition but not the modified biochar).

In some embodiments, the composition has a water absorption rate lower (e.g., about 1% to 90% lower) than the cement composition (or a composition comprising the cement composition but not the modified biochar).

In some embodiments, the composition has an electric conductivity higher (e.g., about 1% to 40% higher) than the cement composition (or a composition comprising the cement composition but not the modified biochar).

In some embodiments, a mean size of the modified biochar is within a range of 1 to 50 μm.

In some embodiments, a mean size of the cement composition is within a range of 1 to 50 μm.

In some embodiments, the modified biochar comprises carbon (e.g., about 80% by weight), hydrogen (e.g., about 1% by weight), and nitrogen (e.g., about 0.2% by weight).

In some embodiments, the composition is a paste or a mortar.

In another aspect, the present disclosure provides a method comprising: preparing a modified biochar by mixing a biochar and a hydrophobic agent, wherein the modified biochar is more hydrophobic than the biochar; and combining a cement composition and the modified biochar to form a composition.

In some embodiments, the biochar is prepared by pyrolysis of wood chips.

In some embodiments, the hydrophobic agent is mixed after the pyrolysis.

In some embodiments, the biochar is comminuted in the presence of the hydrophobic agent.

In some embodiments, a mass ratio of the hydrophobic agent to the biochar is within a range of about 1:100 to 1:10.

In some embodiments, the biochar is comminuted by using a mortar and pestle.

In some embodiments, the method further comprises adding water to the composition.

In some embodiments, the composition is piezoresistive (e.g., characterized in that the composition has a linear correlation between an applied stress and a change in resistivity).

In some embodiments, the composition comprises the modified biochar within a range of 1 weight % to 30 weight % of a combination of the cement composition and the biochar.

In some embodiments, the hydrophobic agent is selected from the group consisting of stearic acid, oleic acid, myristic acid and combinations thereof.

In another aspect, the present disclosure provides a composition produced by one or more methods described herein.

In another aspect, the present disclosure provides for methods of producing a mortar for use in construction, such methods comprising: preparing a biochar using pyrolysis; preparing a modified biochar by mixing the biochar and a hydrophobic agent, wherein the hydrophobic agent comprises stearic acid, wherein the modified biochar comprises from about 2 weight % to about 20 weight % of the hydrophobic agent, wherein preparing the modified biochar comprises comminuting the biochar and the hydrophobic agent (e.g., for about 1 hour to about 5 hours); combining a cement composition and the modified biochar to create a binder, wherein the modified biochar comprises from about 1 weight % to about 30 weight % of the combination of the cement composition and the modified biochar; adding water to the binder in a mass ratio of about 0.25 to 0.8 of the water to the binder; adding a fine aggregate to the binder in a mass ratio of about 2 to 3 of the fine aggregate to the binder; and mixing the water, the fine aggregate, and the binder to produce the mortar.

In another aspect, the present disclosure provides for mortars for use in construction, wherein such mortars comprise: at least one cement composition; a modified biochar comprising a biochar and a hydrophobic agent, wherein the hydrophobic agent comprises stearic acid, wherein the modified biochar comprises from about 2 weight % to about 20 weight % of the hydrophobic agent, wherein a mean size of the modified biochar is within a range of 1 to 50 μm, wherein the modified biochar comprises from about 1 weight % to about 10 weight % of the total weight of a combination of the at least one cement composition and the modified biochar; and water, wherein the mortar is characterized in that the composition is piezoresistive, wherein the composition is characterized in that the composition has a 1% to 90% lower water absorption rate than the at least one cement composition (or a composition comprising the at least one cement composition but not the modified biochar).

BRIEF DESCRIPTION OF THE DRAWING

The Drawing, which is comprised of at least the following Figures, is for illustration purposes only, not for limitation.

FIGS. 11A-11C show exemplary measures of water absorption vs square root of time, percentage decrease of initial water absorption rates, and percentage decrease of secondary water absorption rates with various modified biochar contents, respectively. Data labels show the percent variations in water absorption rates due to the addition of modified biochar.

DEFINITIONS

Figure 1:
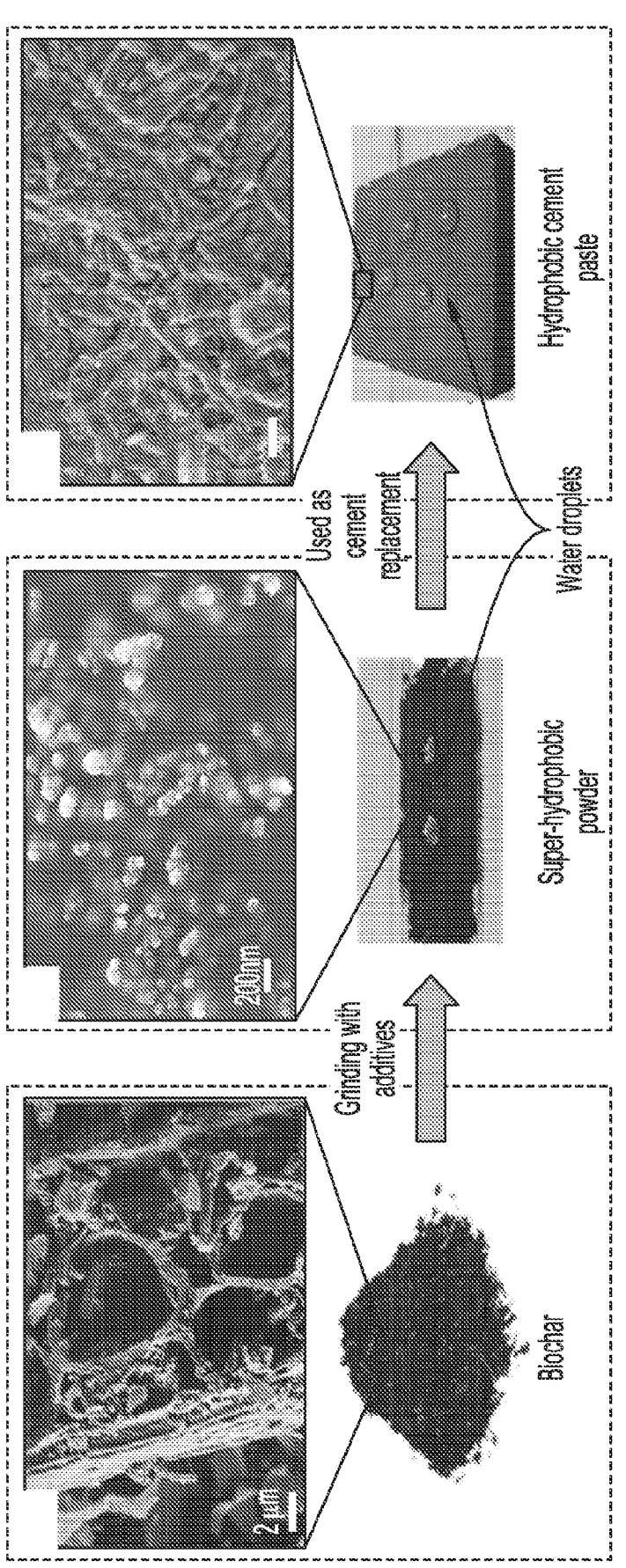
FIG. 1 includes exemplary optical images and scanning electron microscope (SEM) images of biochar, modified biochar, and a composition comprising a cement composition and modified biochar in accordance with the present disclosure.

In this application, unless otherwise clear from context, (i) the term "a" may be understood to mean "at least one"; (ii) the term "or" may be understood to mean "and/or"; (iii) the terms "comprising" and "including" may be understood to encompass itemized components or steps whether presented by themselves or together with one or more additional components or steps; and (iv) the terms "about" may be understood to permit standard variation as would be understood by those of ordinary skill in the art; and (v) where ranges are provided, endpoints are included.

About: The term "about", when used herein in reference to a value, refers to a value that is similar, in context to the referenced value. In general, those skilled in the art, familiar with the context, will appreciate the relevant degree of variance encompassed by "about" in that context. For example, in some embodiments, the term "about" may encompass a range of values that within 25%, 20%, 19%, 18%, 17%, 16%, 15%, 14%, 13%, 12%, 11%, 10%, 9%, 8%, 7%, 6%, 5%, 4%, 3%, 2%, 1%, or less of the referred value.

Agent: As used herein, the term "agent", may refer to an entity or phenomenon. In some embodiments, an agent may be characterized by a particular feature and/or effect. In some embodiments, an agent may be a compound, molecule, or entity of any chemical class including, for example, a small molecule, polypeptide, nucleic acid, saccharide, lipid, metal, or a combination or complex thereof. In some embodiments, the term "agent" may refer to a compound, molecule, or entity that comprises a polymer. In some embodiments, the term may refer to a compound or entity that comprises one or more polymeric moieties. In some embodiments, the term "agent" may refer to a compound, molecule, or entity that is substantially free of a particular polymer or polymeric moiety. In some embodiments, the term may refer to a compound, molecule, or entity that lacks or is substantially free of any polymer or polymeric moiety. In some embodiments, an agent may be or comprise a system or device. In some embodiments, an agent may be or comprise a force such as an electric force, a gravitational force, a magnetic force, etc.

Biochar: As used herein, the term "biochar" refers to a solid carbon-rich material. In some embodiments, biochar is formed by the pyrolysis of biomass (e.g., by heating biomass in an oxygen-free or low oxygen environment such that it does not (or only partially) combusts). In some embodiments, biochar is formed by acid hydrolysis and dehydration or hydrothermal treatment of biomass. Biochar also may be called hydrochar in some instances.

Biomass: As used herein, the term "biomass" refers to any cellulosic or lignocellulosic material and includes materials comprising cellulose and/or lignocellulose, and optionally further comprising hemicellulose, lignin, starch, oligosaccharides and/or monosaccharides. Biomass may also comprise additional components, such as protein and/or lipid. Biomass may be derived from a single source, or biomass can comprise a mixture derived from more than one source; for example, biomass could comprise a mixture of corn cobs and corn stover, or a mixture of grass and leaves. Biomass includes, but is not limited to, bioenergy crops, agricultural residues, municipal solid waste, industrial solid waste, sludge from paper manufacture, yard waste, wood and forestry waste or a combination thereof. Examples of biomass include, but are not limited to, corn grain, corn cobs, crop residues such as corn husks, corn stover, grasses, wheat, wheat straw, barley, barley straw, hay, rice straw, switchgrass, waste paper, sugar cane bagasse, sorghum, soy, components obtained from milling of grains, trees, branches, roots, leaves, wood chips, sawdust, shrubs and bushes, vegetables, fruits, flowers, and animal manure or a combination thereof. In one embodiment, biomass that is particularly useful includes biomass that has a relatively high carbohydrate value, is relatively dense, and/or is relatively easy to collect, transport, store and/or handle. In some embodiments, biomass that is useful includes corn cobs, corn stover, sawdust, and sugar cane bagasse. The term 'biomass' can also include: (i) waste products including animal manure such as poultry derived waste; (ii) commercial or recycled material including plastic, paper, paper pulp, cardboard, sawdust, timber residue, wood shavings and cloth; (iii) municipal waste including sewage waste; (iv) agricultural waste such as coconut shells, pecan shells, almond shells, coffee grounds; and (v) agricultural feed products such as rice straw, wheat straw, rice hulls, corn stover, corn straw, and corn cobs.

Cement composition: As used herein, the term "cement composition" refers to a binder, a substance used for construction that sets, hardens, and adheres to other materials to bind them together. In certain embodiments, cement may be utilized to bind sand and gravel (aggregate) together. In certain embodiments, cement mixed with fine aggregate produces mortar for masonry. In certain embodiments, cement mixed with sand and gravel, produces concrete. Cements used in construction are usually inorganic, often lime or calcium silicate based, and can be characterized as either hydraulic or non-hydraulic, depending on the ability of the cement to set and harden in the presence of water.

Hydrophilic: As used herein, the term "hydrophilic" and/or "polar" may refer to a tendency to mix with, dissolve easily in, or be wetted by water. In some embodiments, hydrophilicity is measured by contact angle measurement between water and a solid surface using techniques as would be understood by one of skill in the art. In some embodiments, a hydrophilic material has a contact angle between water and a surface of less than 90°.

Hydrophobic: As used herein, the term "hydrophobic" and/or "non-polar" may refer to a tendency to repel (e.g., not combine with) or an inability to dissolve easily in, water. In some embodiments, hydrophilicity is measured by contact angle measurement between water and a surface using techniques as would be understood by one of skill in the art. In some embodiments, a hydrophilic material is identified as having a contact angle between water and a surface of greater than 90°.

Pyrolysis: As used herein, the term "pyrolysis" refers to the thermochemical decomposition of organic material at elevated temperatures in an environment with limited amounts of an oxidizing agent or in the absence of an oxidizing agent, such as oxygen. In some embodiments, the temperatures and rate of temperature change vary depending on the type of biomass being treated, the desired products, etc. Pyrolysis primarily yields water, syngas, light organic compounds, heavy organic compounds, and biochar. In some embodiments, some of the said organic compounds are acids. Other acids that are non-organic in nature are sometimes obtained from the pyrolysis process. In certain embodiments, acids such as hydrogen chloride are a by-product of the pyrolysis of biomass.

DETAILED DESCRIPTION

The following description is for illustration and exemplification of the present disclosure only and is not intended to limit the present disclosure to the specific embodiments described herein. Unless defined otherwise, technical and scientific terms have the same meaning as commonly understood by one of ordinary skill in the art to which this disclosure belongs. All references cited herein, including patent applications and publications, are incorporated by reference in their entirety.

Cement based concrete infrastructures often exhibit premature durability damage (e.g., D-cracks, spalling, scaling, and reinforcement corrosion). Water may be an essential ingredient of these chemical and physical degradation processes of cementitious composites. Physical and/or chemical phenomena associated with water transport in porous cement-based materials may be related to its permeability. For example, water in cement-based composites reacts and evaporates during the hardening process, resulting in the formation of capillary pores. Liquid and gas can infiltrate into the concrete matrix through these capillaries with and without pressure. Moisture sorption (including absorption and adsorption) can lead to the introduction of detrimental ions (e.g., chloride salts, sulfates, etc.) into the hydrated cement composition. The ions may destroy the chemical stability of the matrix. Therefore, the durability performances of cement compositions are affected by their permeability. Reducing permeability or moisture sorption may improve the resistance of cement compositions to the penetration of detrimental ions.

Water absorption rate coefficients are useful to predict the service life of concrete (e.g., comprising a cement composition) as a structural material. Commercially available permeability reducing admixtures (PRAs) can be used to achieve low water absorption of a cement composition. The high cost of PRAs has hindered their application in concrete infrastructures. Commercially-available PRAs are also known to increase the setting time, to decrease the strength of the concrete mixes and to be less effective in marine environments.

Monitoring of stress-strains can be achieved by measuring electrical resistance. Traditional cement compositions (e.g., Portland cement) have low electrical conductivity. To monitor stress-strains, conductive materials need to be added to increase the conductivity of the traditional cement compositions through different processes (e.g., contacting conduction, tunneling effect).

In accordance with some embodiments, the present disclosure provides methods for preparation of certain compositions (e.g., comprising a cement composition and a biochar and/or one or more hydrophobic agents) that may offer sufficient mechanical and chemical stability. In some embodiments, disclosed compositions may offer different or unique properties that, for example, may address previously unmet requirements associated with monitoring of stress-strains in the compositions.

The present disclosure is based, in part, on a surprising insight that desirable compositions (e.g., comprising a cement composition and a biochar) can be achieved via modifying biochar. In some embodiments, a composition comprises biochar (e.g., modified biochar) and a cement composition. In some embodiments, a modified biochar comprises biochar and at least one hydrophobic agent.

Biochar

As will be appreciated by one of skill in the art, biochar may comprise any of a variety of application-appropriate characteristics. In some embodiments, biochar in accordance with the present disclosure is a material comprising high carbon content (e.g., higher than 70%), made by direct thermal decomposition of organic material (e.g., biomass (e.g., wood, agriculture residues, leaves), biodegradable waste materials). In some embodiments, biochar is characterized in that it is black, highly porous (e.g., about 0.016 to 0.25 $cm^3$/g), lightweight (e.g., about 1.5 to 2 g/$cm^3$), and/or fine-grained (e.g., mean particle size of about 1 μm to about 1 mm) and/or has a large surface area (e.g., up to about 490 $m^2$/g).

The present disclosure encompasses the recognition that the creation of biochar may include any known method. By way of non-limiting example, in some embodiments, biochar may be created via a pyrolysis process. In some embodiments, pyrolysis for biochar is performed in the absence of oxygen or substantially low oxygen conditions. A specific yield from pyrolysis may be dependent on process condition (e.g., temperature, residence time, and heating rate). For example, temperatures of 400-500° C. (673-773 K) produce more solid products (e.g., biochar), whereas temperatures above 700° C. (973 K) favor the yield of liquid and gas fuel components. Winsley, Peter (2007). "Biochar and bioenergy production for climate change mitigation". New Zealand Science Review. 64. Pyrolysis may occur more quickly at the higher temperatures (e.g., requiring seconds rather than hours). In some embodiments, biochar may be created via acid hydrolysis and dehydration. In some embodiments, biochar may be created via hydrothermal treatment.

In accordance with various embodiments, biochar may comprise any known application-appropriate composition. For example, in some embodiments, biochar comprises carbon, hydrogen and nitrogen. In some embodiments, biochar comprises carbon within a range of about 75 weight % to about 99 weight %, about 75 weight % to about 95 weight %, about 75 weight % to about 90 weight %, or about 75 weight % to about 85 weight %. In some embodiments, biochar comprises hydrogen within a range of about 0.1 weight % to about 5 weight %, about 0.1 weight % to about 3 weight %, about 0.1 weight % to about 2 weight %, about 0.5 weight % to about 2 weight %, or about 1 weight % to about 2 weight %. In some embodiments, biochar comprises nitrogen within a range of about 0.05 weight % to a about 2 weight %, about 0.05 weight % to a about 1 weight %, about 0.05 weight % to a about 0.5 weight %, or about 0.1 weight % to about 0.5 weight %.

Modified Biochar

In some embodiments, modified biochar in accordance with the present disclosure comprises biochar and a hydrophobic agent. In some embodiments, a hydrophobic agent is more hydrophobic than biochar. In some embodiments, modified biochar is more hydrophobic than biochar (e.g., a non-modified biochar).

In some embodiments, hydrophobicity is measured by contact angle measurement. Contact angle is an angle, conventionally measured through the liquid, where a liquid—vapor interface meets a solid surface. It quantifies the wettability of a solid surface by a liquid via the Young equation. A given system of solid, liquid, and vapor at a given temperature and pressure has a unique equilibrium contact angle. However, in practice a dynamic phenomenon of contact angle hysteresis is often observed, ranging from the advancing (maximal) contact angle to the receding (minimal) contact angle. The equilibrium contact is within those values, and can be calculated from them. The equilibrium contact angle reflects the relative strength of the liquid, solid, and vapor molecular interaction. The theoretical description of contact angle arises from the consideration of a thermodynamic equilibrium between the three phases: the liquid phase (L), the solid phase (S), and the gas or vapor phase (G) (which could be a mixture of ambient atmosphere and an equilibrium concentration of the liquid vapor). If the solid—vapor interfacial energy is denoted by $\gamma_{SG}$, the solid—liquid interfacial energy by $\gamma_{SL}$, and the liquid—vapor interfacial energy (i.e. the surface tension) by $\gamma_{LG}$, then the equilibrium contact angle $\theta_c$ is determined from these quantities by the Young equation:

$$\gamma_{SG} - \gamma_{SG} - \gamma_{SG} \cos \theta_c = 0 \qquad \text{Equation (1)}$$

Generally, if the water contact angle is smaller than 90°, the solid surface is considered hydrophilic and if the water contact angle is larger than 90°, the solid surface is considered hydrophobic. Highly hydrophobic surfaces made of low surface energy (e.g. fluorinated) materials may have water contact angles as high as about 120°.

In some embodiments, a water contact angle of a hydrophobic agent is higher than a water contact angle of biochar. In some embodiments, a water contact angle of modified biochar is higher than a water contact angle of biochar (e.g., a non-modified biochar). In some embodiments, modified biochar has a water contact angle higher than 150° (e.g., superhydrophobic).

Hydrophobic Agents

In accordance with various embodiments, any application-appropriate hydrophobic agent(s) may be used. In some embodiments, two or more hydrophobic agents are included in a particular composition (e.g., 2, 3, 4, 5, 6, 7, 8, 9, 10 or more hydrophobic agents). In some embodiments, a hydrophobic agent comprises one or more of fatty acid. In some embodiments, a hydrophobic agent is fatty acid, e.g., from the graded series of surface-active agents in terms of the Hydrophilic-Lipophilic Balance (HLB) scale. In some embodiments, a hydrophobic agent is or comprises at least one of stearic acid, oleic acid, myristic acid, and combinations thereof. In some embodiments, a hydrophobic agent comprises stearic acid In some embodiments, modified biochar comprises a hydrophobic agent within a range of about 1 weight % to about 10 weight %, about 1 weight % to about 8 weight %, about 1 weight % to about 6 weight %, or about 2 weight % to about 6 weight %.

In some embodiments, a hydrophobic agent is associated with modified biochar. In some embodiment, a hydrophobic agent is incorporated on a surface of biochar (e.g., via chemical and/or physical interaction). In some embodiments, a hydrophobic agent is incorporated in biochar (e.g., in a pore of biochar) (e.g., via chemical and/or physical interaction). In some embodiments, a hydrophobic agent is incorporated both on a surface and in a pore of biochar (e.g., via chemical and/or physical absorption). In some embodiments, a hydrophobic agent is proximate to biochar.

In some embodiments, a method of preparing modified biochar comprises mixing biochar and a hydrophobic agent. In some embodiments, mixing may be or comprise comminution. In some embodiments, comminution may be or comprise milling, crushing, and/or homogenization. In some embodiments, biochar and a hydrophobic agent are milled. In some embodiments, biochar and a hydrophobic agent are milled for about 1 to about 5 hours, for about 1 to about 4 hours, for about 2 to about 5 hours, for about 2 to about 4 hours, or for about 1 to about 3 hours. Without wishing to be bound by any particular theory, a hydrophobic agent may work as a grinding aid. In some embodiments, biochar and a hydrophobic agent are ball milled (e.g., in a planetary ball mill, e.g., at 2520 r/min for 3 hours).

In some embodiments, a mean size of modified biochar is smaller than a mean size of biochar (e.g., unmodified biochar). In some embodiments, a mean size of modified biochar is within a range of about 1 μm to about 100 μm, about 1 μm to about 50 μm, about 1 μm to about 30 μm, about 1 μm to about 20 μm, or about 5 μm to about 20 μm. In certain embodiments, a size of the modified biochar refers to a dimension of a particle of the modified biochar. In certain embodiments, a dimension may refer to the largest dimension of the particle (e.g., a length of the particle), an average dimension of the particle, or a diameter of the particle. In certain embodiments, a particle may be described as a spherical particle having a given dimension. In certain embodiments, the size of a particle may be measured using any appropriate technique known to a person of skill in the art including, but not limited to, laser diffraction, dynamic light scattering, imaging, sedimentation, electrophoretic light scattering, or electrozone sensing.

Cement Composition

In some embodiments, a cement composition in accordance with the present disclosure is a substance used for construction that sets, hardens, and adheres to other materials to bind them together. In some embodiments, a cement composition may be used to bind, for example, sand and gravel.

In some embodiments, a cement composition is hydraulic (e.g., can set and become adhesive due to a chemical reaction between dry ingredients and water). In some embodiments, a cement composition is non-hydraulic (e.g., does not set in wet conditions or under water, but reacts with carbon dioxide).

In accordance with various embodiments, any application-appropriate cement may be used. In some embodiments, a cement composition comprises a Portland cement (e.g., ordinary Portland cement (OPC), white Portland cement, OPC type I, II, II, IV, and/or V). In some embodiments, Portland cement is a hydraulic cement produced by pulverizing clinkers comprising hydraulic calcium silicates. In some embodiments, Portland cement comprises CaO, $SiO_2$, $Al_2O_3$, $Fe_2O_3$, and/or $SO_3$. In some embodiments, Portland cement comprises calcium silicates (e.g., 3 CaO·SiO2, 2 CaO·SiO2) more than about 50 weight %, about 60 weight %, or about 67 weight %. In some embodiments, Portland cement comprises aluminium- and iron-containing clinker phases. In some embodiments, Portland cement comprises magnesium oxide (e.g., less than about 5 weight %). In some embodiments, a weight ratio of CaO to $SiO_2$ is less than about 2.0.

In some embodiments, a cement composition comprises Portland cement type I (e.g., about 55 weight % of $C_3S$, (i.e., $(CaO)_3 \cdot SiO_2$), about 19 weight % of $C_2S$ (i.e., $(CaO)_2 \cdot SiO_2$), about 10 weight % of $C_3A$ (i.e., $(CaO)_3 \cdot Al_2O_3$), about 7 weight % of $C_4AF$ (i.e., $(CaO)_3 \cdot Al_2O_3 \cdot Fe_2O_3$), about 2.8 weight % of MgO, about 2.9 weight % of $SO_3$, and about 1.0 weight % of free CaO). In some embodiments, a cement composition comprises less than about 15 weight % of $C_3A$. In some embodiments, unless another type is specified, type I is assumed.

In some embodiments, a cement composition comprises Portland cement type II (e.g., comprising about 51 weight % of $C_3S$, about 24 weight % of $C_2S$, about 6 weight % of $C_3A$, about 11 weight % of $C_4AF$, about 2.9 weight % of MgO, about 2.5 weight % of $SO_3$, and about 1.0 weight % of free CaO. In some embodiments, a cement composition comprises less than about 8 weight % of $C_3A$.

In some embodiments, a cement composition comprises Portland cement type III (e.g., comprising about 57 weight % of $C_3S$, about 19 weight % of $C_2S$, about 10 weight % of $C_3A$, about 7 weight % of $C_4AF$, about 3.0 weight % of MgO, about 3.1 weight % of $SO_3$, about and about 1.3 weight % of free CaO).

In some embodiments, a cement composition comprises Portland cement type IV (e.g., comprising about 28 weight % of $C_3S$, about 49 weight % of $C_2S$, about 4 weight % of $C_3A$, about 12 weight % of $C_4AF$, about 1.8 weight % of MgO, about 1.9 weight % of $SO_3$, and about 0.8 weight % of free CaO).

In some embodiments, a cement composition comprises Portland cement type V (e.g., comprising about 38 weight % of $C_3S$, about 43 weight % of $C_2S$, about 4 weight % of $C_3A$, about 9 weight % of $C_4AF$, about 1.9% of MgO, about 1.8 weight % of $SO_3$, and about 0.8% of free CaO).

In some embodiments, a cement composition is less hydrophobic than biochar. In some embodiments, a cement composition is less hydrophobic than modified biochar.

Composition Comprising a Cement Composition

In some embodiments, a composition in accordance with the present disclosure comprises a cement composition and a modified biochar.

In some embodiments, a composition comprises modified biochar within a range of about 1 weight % to about 20 weight %, about 2 weight % to about 20 weight % or about 2.5 weight % to about 15 weight % of a combination of the cement composition and the modified biochar. In some embodiments, a composition comprises modified biochar within a range of about 1 weight % to about 3 weight %, about 3 weight % to about 7 weight %, about 8 weight % to about 12 weight %, or about 13 weight % to about 17 weight % of a combination of the cement composition and the modified biochar. In some embodiments, a composition comprises modified biochar within a range of about 1 weight %, about 1.5 weight %, about 2 weight %, about 2.5 weight %, about 3 weight %, about 3.5 weight %, about 4 weight %, about 4.5 weight %, about 5 weight %, about 5.5 weight %, about 6 weight %, about 6.5 weight %, about 7 weight %, about 7.5 weight %, about 8 weight %, about 8.5 weight %, about 9 weight %, about 9.5 weight %, about 10 weight %, about 10.5 weight %, about 11 weight %, about 11.5 weight %, about 12 weight %, about 12.5 weight %, about 13 weight %, about 13.5 weight %, about 14 weight %, about 14.5 weight %, about 15 weight %, about 15.5 weight %, about 16 weight %, about 16.5 weight %, about 17 weight %, about 17.5 weight %, about 18 weight %, about 18.5 weight %, about 19 weight %, about 19.5 weight %, or about 20 weight % of a combination of the cement composition and the modified biochar. In some embodiments, a composition comprises modified biochar at least about 1 weight %, about 2 weight %, about 3 weight %, about 4 weight %, about 5 weight %, about 6 weight %, about 7 weight %, about 8 weight %, about 9 weight %, or about 10 weight %. In some embodiments, a composition comprises modified biochar at most about 20 weight %, about 19 weight %, about 18 weight %, about 17 weight %, about 16 weight %, or about 15 weight %.

In some embodiments, a composition comprises water. In some embodiments, a weight ratio of water to a combination of a cement composition and modified biochar is about 0.1 to about 10, about 0.1 to about 5, about 0.1 to about 3, about 0.1 to about 1, or about 0.1 to about 0.5.

In some embodiments, a composition comprises fine aggregates (e.g., sand, gravel). In some embodiments, a weight ratio of a combination of the cement composition and modified biochar to fine aggregates is within a range of about 1 to about 100, about 1 to about 10, about 1 to about 5, about 1 to about 4, or about 2 to about 3.

In some embodiments, a method of preparing a composition comprises mixing modified biochar and a cement composition. In some embodiments, modified biochar and a cement composition are mixed for about 1 minute to about 10 minutes, about 1 minute to about 5 minutes, or about 1 minute to about 3 minutes. In some embodiments, modified biochar and a cement composition are mixed at a speed within a range of about 10 r/min to about 500 r/min, about 50 r/min to about 500 r/min, or about 100 r/min to about 300 r/min. In some embodiments, a mixing speed may be increased. For example, in some embodiments, a first mixing speed is smaller than a second mixing speed. In some embodiments, a first mixing speed is within a range of about 10 r/min to about 200 r/min, about 50 r/min to about 200 r/min, or about 100 r/min to about 200 r/min. In some embodiments, a second mixing speed is within a range of about 200 r/min to about 500 r/min, about 200 r/min to about 400 r/min, about 200 r/min to about 300 r/min, or about 250 r/min to about 300 r/min.

In some embodiments, a method of preparing a composition further comprises adding water to a combination of modified biochar and a cement composition. In some embodiments, a mixing speed is within a range of about 10 r/min to about 200 r/min, about 50 r/min to about 200 r/min, or about 100 r/min to about 200 r/min.

In some embodiments, a method of preparing a composition further comprises adding fine aggregates (e.g., sand, gravel) to a combination of modified biochar and a cement composition. In some embodiments, fine aggregates are added over within a time range of about 10 seconds to about 5 minutes, about 10 seconds to about 1 minute, about 10 seconds to about 45 seconds, about bout 15 seconds to about 45 seconds. In some embodiments, a mixing speed during the addition of fine aggregates is substantially similar to a mixing speed during the addition of water. In some embodiments, mixing may be stopped to change a mixing speed. In some embodiments, a mixing speed is increased to a range of about 200 r/min to about 500 r/min, about 200 r/min to about 400 r/min, about 200 r/min to about 300 r/min, or about 250 r/min to about 300 r/min. In some embodiments, the increased mixing speed is maintained for time within a range of about 10 seconds to about 5 minutes, about 10 seconds to about 1 minute, about 10 seconds to about 45 seconds, about bout 15 seconds to about 45 seconds. In some embodiments, mixing may be stopped for a time range of about 10 seconds to about 5 minutes, about 30 seconds to about 3 minutes, or about 30 seconds to about 2 minutes. In some embodiments, mixing may be resumed at a mixing speed within a range of about 200 r/min to about 500 r/min, about 200 r/min to about 400 r/min, about 200 r/min to about 300 r/min, or about 250 r/min to about 300 r/min. In some embodiments, resumed mixing may be maintained for time within a range of about 1 minute to about 5 minutes, about 1 minute to about 3 minute, or about 30 seconds to about 1.5 minutes.

Characterization

In some embodiments, provided compositions may be characterized in order to determine, for example, compressive strength. In some embodiments, a composition comprising modified biochar and a cement composition has compressive strength within a range of about 30 MPa to about 70 MPa (e.g., about 30 MPa to about 45 MPa, about 40 MPa, about 35 MPa to about 55 MPa, about 45 MPa, about 45 MPa to about 60 MPa, about 50 MPa, at least 30 MPa) (e.g., measured after about 7 days, about 14 days, about 28 days, 35 days, 42 days or about 56 days of sealed cure). In some embodiments, a composition comprising modified biochar and a cement composition has compressive strength lower (e.g., about 1% to about 50% lower, about 1% to about 17% lower, about 1% to about 16% lower, about 1% to about 9% lower, about 1% to about 3% lower, about 1% to about 25% lower, about 1% to about 14% lower, about 1% to about 7% lower, about 1% to about 5% lower, about 1% to about 9% lower, about 1% to about 5% lower, about 1% to about 4% lower, about 2% to about 17% lower, about 2% to about 16% lower, about 2% to about 9% lower, about 3% to about 25% lower, about 3% to about 14% lower, about 3% to about 7% lower, about 2% to about 21% lower, about 2% to about 9% lower, about 2% to about 5% lower, about 4% to about 21% lower, about 8% to about 21% lower, about 4% to about 9% lower, about 6% to about 25% lower, about 13% to about 25% lower, about 6% to about 14% lower, about 8% to about 17% lower, about 8% to about 16% lower, about 15% to about 17% lower) than a cement composition, or a composition comprising a cement composition but not a modified biochar. In some embodiments, a composition comprising a high amount of modified biochar has lower compressive strength (e.g., measured after about 7 days, about 14 days, about 28 days, 35 days, 42 days or about 56 days of sealed cure). In some embodiments, compressive strength may be measured using a universal testing machine as per American Society for Testing and Materials (ASTM) C109.

In some embodiments, compressive strength of a composition comprising about 1 weight % to about 4 weight % of modified biochar is about 1% to about 10% lower than compressive strength of a cement composition or a composition comprising a cement composition but not a modified biochar. In some embodiments, compressive strength of a composition comprising about 3 weight % to about 7 weight % of modified biochar is about 1% to about 10% lower than compressive strength of a cement composition or a composition comprising a cement composition but not a modified biochar. In some embodiments, compressive strength of a composition comprising about 8 weight % to about 10 weight % of modified biochar is about 5% to about 20% lower than compressive strength of a cement composition or a composition comprising a cement composition but not a modified biochar. In some embodiments, compressive strength of a composition comprising about 13 weight % to about 17 weight % of modified biochar is about 10 to about 30% lower than compressive strength of a cement composition or a composition comprising a cement composition but not a modified biochar.

In some embodiments, provided compositions may be characterized in order to determine, for example, flexural strength. In some embodiments, a composition comprising modified biochar and a cement composition has flexural strength within a range of about 5 MPa to about 9 MPa (e.g., about 5 MPa to about 7.5 MPa, about 5 MPa to about 7 MPa, about 5 MPa to about to about 6 MPa, about 6.5 MPa to about 8.5 MPa, about 6.5 MPa to about 7.5 MPa, about 7.5 to about 9 MPa, about 7.5 to about 8.5 MPa) (e.g., measured after about 7 days, about 14 days, about 28 days, 35 days, 42 days or about 56 days of sealed cure). In some embodiments, a composition comprising modified biochar and a cement composition has flexural strength lower (e.g., about 1% to about 50% lower, about 1% to about 9% lower, about 1% to about 15% lower, about 1% to about 13% lower, about 1% to about 5% lower, about 1% to about 3% lower, about 1% to about 2.5% lower, about 3% to about 9% lower, about 10% to about 15% lower, about 11% to about 15% lower, about 13% to about 15% lower, about 2% to about 13% lower, about 1% to about 4% lower, about 1% to about 3% lower, about 3% to about 13% lower) than a cement composition, or a composition comprising the cement composition but not modified biochar (e.g., measured after about 7 days, about 14 days, about 28 days, 35 days, 42 days or about 56 days of sealed cure). In some embodiments, a composition comprising a high amount of modified biochar has lower flexural strength. In some embodiments, flexural strength may be measured by performing a three points bending test.

In some embodiments, flexural strength of a composition comprising about 1 weight % to about 4 weight % of modified biochar is about 1% to about 15% lower than flexural strength of a cement composition or a composition comprising a cement composition but not a modified biochar. In some embodiments, flexural strength of a composition comprising about 3 weight % to about 7 weight % of modified biochar is about 1% to about 15% lower than flexural strength of a cement composition or a composition comprising a cement composition but not a modified biochar. In some embodiments, flexural strength of a composition comprising about 8 weight % to about 12 weight % of modified biochar is about 5% to about 20% lower than flexural strength of a cement composition or a composition comprising a cement composition but not a modified biochar. In some embodiments, flexural strength of a composition comprising about 13 weight % to about 17 weight % of modified biochar is about 10% to about 25% lower than flexural strength of a cement composition or a composition comprising a cement composition but not a modified biochar. Without wishing to be bound by any particular theory, inert nature of modified biochar and/or its increased porosity may contribute to reduced flexural strength.

In some embodiments, provided compositions may be characterized in order to determine, for example, heat release (e.g., per mass of a cement composition). In some embodiments, a composition comprising modified biochar and a cement composition has a heat release higher (e.g., about 1% to 50% higher, about 1% to about 20% higher, about 10% higher) than a cement composition, or a composition comprising the cement composition but not modified biochar (e.g., measured after about 7 days, about 14 days, about 28 days, 35 days, 42 days or about 56 days of sealed cure). In some embodiments, heat release of a composition comprising about 13 weight % to 17 weight % of modified biochar is about 1% to about 15% higher than heat release of a cement composition or a composition comprising the cement composition but not modified biochar. Without wishing to be bound by any particular theory, increased heat release is attributed by high surface area of modified biochar provided additional nucleation sites for C—S—H. In some embodiments, heat release may be measured via isothermal calorimeter.

In some embodiments, provided compositions may be characterized in order to determine, for example, chemically bound water (e.g., per mass of a cement composition). In some embodiments, a composition comprising modified biochar and a cement composition has chemically bound water within a range of about 6% to about 9% per gram of the cement composition and the modified biochar (e.g., measured after about 7 days, about 14 days, about 28 days, 35 days, 42 days or about 56 days of sealed cure). In some embodiments, a composition comprising modified biochar and a cement composition comprises chemically bound water less (e.g., about 1 to about 50% less) than the cement composition, or a composition comprising a cement composition but not modified biochar (e.g., measured after about 7 days, about 14 days, about 28 days, 35 days, 42 days or about 56 days of sealed cure). In some embodiments, chemically bound water may be measured by TGA.

In some embodiments, provided compositions may be characterized in order to determine, for example, a relative amount of $Ca(OH)_2$. In some embodiments, a composition comprising modified biochar and a cement composition has $Ca(OH)_2$ within a range of about 6% to about 9% per gram of the cement composition and the modified biochar (e.g., about 10% per gram of the cement composition and the modified biochar) (e.g., measured after about 7 days, about 14 days, about 28 days, 35 days, 42 days or about 56 days of sealed cure). In some embodiments, a composition comprising modified biochar and a cement composition comprises $Ca(OH)_2$ less (e.g., about 1% to about 50% less, about 1% to about 40% less, about 1% to about 30% less, about 5% to about 20% less, about 10% less) than a cement composition, or a composition comprising a cement composition but not modified biochar (e.g., measured after about 7 days, about 14 days, about 28 days, 35 days, 42 days or about 56 days of sealed cure). In some embodiments, a relative amount of $Ca(OH)_2$ may be measured by TGA.

In some embodiments, provided compositions may be characterized in order to determine, for example, a flow index. In some embodiments, a composition comprising modified biochar and a cement composition has flow index lower (e.g., about 1% to about 150% lower, about 1% to 95% lower, about 20% to about 95% lower, about 40% to about 95% lower, about 60% to about 95% lower, about 90% lower, about 30% lower, about 56% lower, about 83% lower, at least 20% lower, at least 40% lower, at least 60% lower, at least, 85% lower) than a cement composition, or a composition comprising the cement composition but not modified biochar (e.g., measured after about 7 days, about 14 days, about 28 days, 35 days, 42 days or about 56 days of sealed cure). In some embodiments, a composition comprising a high amount of modified biochar has lower flow index. In some embodiments, flow index may be measured using ASTM C1437 standard.

In some embodiments, flow index of a composition comprising about 1 weight % to about 4 weight % of modified biochar is about 1 to about 50% lower than flow index of a cement composition or a composition comprising the cement composition but not modified biochar. In some embodiments, flow index of a composition comprising about 3 weight % to about 7 weight % of modified biochar is about 1% to about 75% lower than flow index of a cement composition or a composition comprising the cement composition but not modified biochar. In some embodiments, flow index of a composition comprising about 8 weight % to about 10 weight % of modified biochar is about 1% to about 95% lower than flow index of a cement composition or a composition comprising the cement composition but not modified biochar. In some embodiments, flow index of a composition comprising about 13 weight % to about 17 weight % of modified biochar is about 1% to about 95% lower than flow index of a cement composition or a composition comprising the cement composition but not modified biochar.

In some embodiments, provided compositions may be characterized in order to determine, for example, a specific surface area. In some embodiments, a composition comprising modified biochar and a cement composition has a specific surface area higher (e.g., about 1 to about 50% higher) than a cement composition, or a composition comprising a cement composition but not modified biochar.

In some embodiments, provided compositions may be characterized in order to determine, for example, water absorption. In some embodiments, a composition comprising modified biochar and a cement composition has water absorption lower (e.g., about 1% to about 100% lower, e.g., about 10% to about 75%) than a cement composition, or a composition comprising a cement composition but not modified biochar (e.g., measured after about 7 days, about 14 days, about 28 days, 35 days, 42 days or about 56 days of sealed cure). In some embodiments, a composition comprising a high amount of modified biochar has lower water absorption.

In some embodiments, water absorption of a composition comprising about 1 weight % to about 4 weight % of modified biochar is about 1% to about 30% lower than water absorption of a cement composition or a composition comprising the cement composition but not modified biochar. In some embodiments, water absorption of a composition comprising about 3 weight % to about 7 weight % of modified biochar is about 10% to about 65% lower than water absorption of a cement composition or a composition comprising the cement composition but not modified biochar. In some embodiments, water absorption of a composition comprising about 8 weight % to about 12 weight % of modified biochar is about 30% to about 75% lower than water absorption of a cement composition or a composition comprising the cement composition but not modified biochar. In some embodiments, water absorption of a composition comprising about 13 weight % to about 17 weight % of modified biochar is about 40% to about 100% lower than water absorption of a cement composition or a composition comprising the cement composition but not modified biochar.

In some embodiments, water absorption may be measured using ASTM C1585 standard. In some embodiments, water absorption is determined from the weight gain using equation 2.

$$\text{Absorption, } I = \frac{(M_t - M_0)}{A * d} \qquad \text{Equation (2)}$$

where, $M_t$ is mass of a sample at a time t, $M_0$ is initial mass of the sample, A is cross-sectional area of a sample, and d is density of water.

In some embodiments, provided compositions may be characterized in order to determine, for example, electric conductivity. In some embodiments, a composition comprising modified biochar and a cement composition has electric conductivity within a range of about 5 to about 30 mS/m (e.g., measured after about 7 days, about 14 days, about 28 days, 35 days, 42 days or about 56 days of sealed cure). In some embodiments, a composition comprising modified biochar and a cement composition has electric conductivity higher (e.g., about 1 to 50% higher) than a cement composition, or a composition comprising a cement composition but not modified biochar. In some embodiments, a composition comprising a high amount of modified biochar has higher electric conductivity (e.g., measured after about 7 days, about 14 days, about 28 days, 35 days, 42 days or about 56 days of sealed cure).

In some embodiments, electric conductivity of a composition comprising about 1 weight % to about 4 weight % of modified biochar is about 1 to about 20% higher than electric conductivity of a cement composition or a composition comprising the cement composition but not modified biochar. In some embodiments, electric conductivity of a composition comprising about 3 weight % to about 7 weight % of modified biochar is about 5% to about 25% higher than electric conductivity of a cement composition or a composition comprising the cement composition but not modified biochar. In some embodiments, electric conductivity of a composition comprising about 8 weight % to about 12 weight % of modified biochar is about 10 to about 40% higher than electric conductivity of a cement composition or a composition comprising the cement composition but not modified biochar. In some embodiments, electric conductivity of a composition comprising about 13 weight % to about 17 weight % of modified biochar is about 10% to about. 40% higher than electric conductivity of a cement composition of a composition comprising the cement composition but not modified biochar.

In some embodiments, electric conductivity may be measured via a two-pole method using a commercially available instrument. Resistivity and conductivity of a sample may be calculated using equations 3 and 4, respectively.

$$\text{Resistivity, } \rho = \frac{R * A}{L} \qquad \text{Equation (3)}$$

where R is resistance, A is a cross-sectional area of the sample and L is the length between the top and bottom plates for resistance measurement.

$$\text{Conductivity, } \sigma = \frac{1}{\rho} \qquad \text{Equation (4)}$$

where, $\rho$ is resistivity.

In some embodiments, provided compositions may be characterized in order to determine, for example, piezoresistance (e.g., characterized in that the composition has a linear correlation between an applied stress and a fractional change in resistivity (FCR)). In some embodiments, a composition comprising modified char and a cement composition is piezoresistive. In some embodiments, a correlation between an applied stress and FCR may be evaluated by coefficients of determination ($R^2$ value). In some embodiments, a composition comprising modified char and a cement composition has a coefficient of determination higher than about 0.5 for a correlation between an applied stress and a fractional change in resistivity. In some embodiments, for a correlation between an applied stress and a fractional change in resistivity, a coefficient of determination of a composition comprising modified biochar is higher (about 100% to about 500%) than a coefficient of determination of cement composition, or a composition comprising a cement composition but not modified biochar. In some embodiments, fractional change in resistivity (FCR) may be determined using equation 5, $$\text{FCR} = (\rho_r - \rho_0)/\rho_0 \qquad \text{Equation (5)}$$

where, $\rho_r$ is resistivity at a certain time, and, $\rho_0$ is resistivity measuredinitially. In some embodiments, resistivity may be determined by equation 3.

In some embodiments, provided compositions may be characterized in that it has self-sensing ability (e.g., ability of a structural material to sense stress, strain, and/or temperature in it without the incorporation of any external sensor). In some embodiments, provided compositions is piezoresistive.

Exemplification

This Example describes an exemplary composition comprising a cement composition and modified biochar in accordance with the present disclosure. A representative manufacturing process is described below. One of skill in the art will appreciate that certain conditions and specific values as described herein may be changed as desired.

Sample Preparation

In this example, biochar particles were, on average, millimeter sized. A chemo mechanical modification was followed to enhance the hydrophobicity of the biochar. Biochar was ground in a planetary ball mill with 4% by weight of stearic acid ($C_{17}H_{35}CO_2H$) for three hours to achieve hydrophobicity. The stearic acid worked as a grinding aid, resulting in a very fine particle size distribution of the biochar with super-hydrophobic surface characteristics (FIG. 1). The obtained product after this process is referred to as modified biochar.

Figure 2:
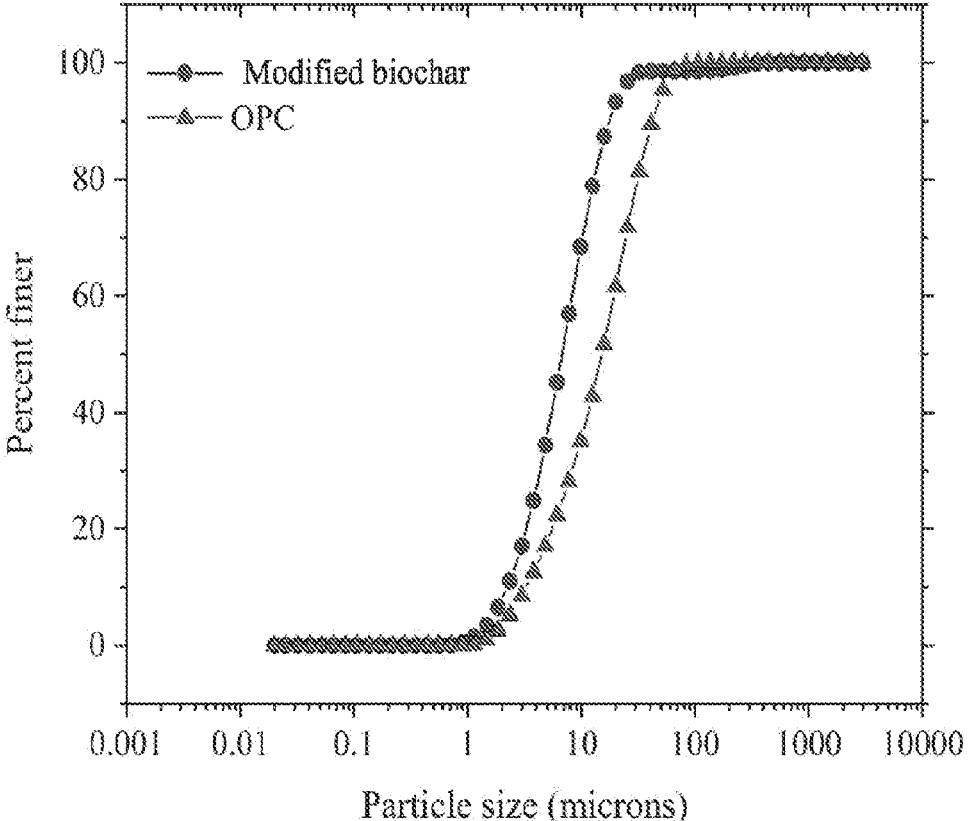
FIG. 2 is a graph showing exemplary particle size distributions of a cement composition and modified biochar.

The materials used in this Example included ordinary Portland cement (OPC), modified biochar, and river sand. The OPC contained 20.1% $SiO_2$, 63.7% CaO, 4.7% $Al_2O_3$, 3.5% $Fe_2O_3$ and 3.1% $SO_3$. The mean particle sizes of the OPC and modified biochar were 19.3 μm and 11.7 μm, respectively. The particle size distribution of those materials (shown in FIG. 2) were determined using a laser particle size analyzer and considering a refractive index of 1.63.

The biochar used in this Example was produced by the pyrolysis of wood chips. The primary product of this process was biofuel, and biochar was the byproduct. The obtained biochar was in bone-dry condition, and it was stored in a sealed plastic container. Based on the CHN analysis, this biochar contained 80.22% Carbon, 1.23% Hydrogen, and 0.2% Nitrogen, by weight.

Paste and mortar samples were prepared for the experimental works using modified biochar as partial replacement for the OPC. Paste samples were used to monitor the effects of modified biochar on a cement composition hydration and microscopic phase formation. Mortar samples were used to monitor the effects of modified biochar on the strengths, water absorption, and self-sensing characteristics. A total of five batches were prepared in each case. The cement replacement levels with modified biochar in these batches were 0% (control batch), 2.5%, 5%, 10% and 15%. The water to binder (cement+modified biochar) ratio was 0.42 and the binder to fine aggregate (e.g., sand) ratio was 2.75 for all the batches. To prepare the paste samples, the selected percentages of modified biochar were first mixed (i.e., dry mixing)

with OPC for two minutes to ensure uniform distribution of these two materials. Water was then added to the mixture and mixed again for two minutes to prepare the paste.

For the mortar sample preparation, the selected percentages of modified biochar and cement contents were mixed in a Hobart mixer for 2 minutes, the first 90 seconds at a slow speed (140±5 r/min) and the remaining 30 seconds at a medium speed (285±10 r/min), to get the modified biochar powder mixed homogeneously with the cement. Next, the ASTM C305 standard mixing procedure was followed to prepare the mortar samples. The cement plus modified biochar mixture was added to the water in the bowl first and mixed at a speed of 140±5 r/min. The entire quantity of sand was then added slowly over 30 seconds while mixing at the same speed. The mixer was then stopped to change the speed to medium (285±10 r/min), and next it was mixed for 30 seconds. After that, the mixer was stopped again, and the mortar was allowed to stand for 90 seconds. Finally, the mixture was mixed again for 60 seconds at a medium speed (285±10 r/min).

Experimental Methods

Flow, Compressive Strength and Flexural Strength Tests

Flow table tests were performed using the ASTM C1437 standard to measure the effect of modified biochar on the workability of the mortar batches. Compressive strengths of 50 mm by 50 mm mortar cubes were determined using a universal testing machine as per ASTM C109 with 900 to 1800 N per second (200-400 lbs per second) loading rate. The flexural strength was determined by performing the three points bending test of beam samples with dimensions of 40 mm×30 mm×180 mm. The mortar samples were tested after 7, 28, and 56 days of sealed curing.

Effects on Cement Hydration Rate and Products

Paste samples were prepared by mixing water with cement and modified biochar. After mixing, approximately 15 g of the paste sample were placed in a glass vial to monitor the heat of hydration. An isothermal calorimeter (TAM Air, TA instrument) was used to measure the heat release from the cement paste over 100 hours at an ambient temperature of 25° C. The effects of modified biochar on the cement hydration products were determined by performing the thermogravimetric analysis (TGA) on the paste samples. Acetone was used to stop the hydration of the cement paste samples after 7, 14 and 28 days of sealed curing. The dried paste samples were then ground using a mortar-and-pestle. Approximately 30-40 mg of the powdered paste sample was tested for each batch. The powder sample was loaded into the pan and kept under an isothermal condition at room temperature for 5 minutes. The temperature of the chamber was then raised up to 980° C. by increments of 10° C. per minute. From this test, the quantitative amounts of chemically-bound water in calcium silicate hydrate (C—S—H) and Ca(OH)$_2$ in the hydrated cement paste were determined. Additionally, Fourier transform infrared (FTIR) spectra were collected to characterize biochar and cement hydration products. Commercially available Nicolet iS50 FTIR from Thermo Scientific was used for this test. The spectra were collected using Attenuated Total Reflection (ATR) mode with 4 cm-1 resolution and 32 scans per sample. Scanning electron microscopy (SEM) images were obtained using a Zeiss-FIB SEM which was operated in high vacuum mode. The instrument was operated using an accelerating voltage of 25 kV.

Water Absorption Rate

Water absorption tests of the mortar cubes were performed by modifying the ASTM C1585 standard test method. After 28 days of sealed curing, the mortar cubes were stored in a controlled environment (50% relative humidity [RH] and 50° C.) for 3 days. The samples were then kept in a sealed container for an additional 15 days for the stabilization of internal humidity. After this conditioning period, all sides of the 50 mm mortar cube specimens were sealed with adhesive tape, except the top and bottom surfaces. The bottom surface of the mortar cube was then submerged in water (approximate depth of submersion=2.5 mm) and the sample weight gain was monitored at regular intervals for up to 9 days. The amount of water absorption in the samples was determined from the weight gain using equation 2 above.

The water absorption rate was calculated in two segments, namely the initial and the secondary absorption rates. As per the standard, the initial rate was taken after the first six hours of the exposure, and the secondary rate was taken for the rest of the time period.

Electrical Conductivity

Resistivities and conductivity of the mortar cube samples were measured after 7, 28, and 56 days of sealed curing. The resistance of the samples was measured as per the two-pole method using a commercially available instrument (Giatec RCON). A constant 600 Hz frequency was used, and a constant weight of 290 gm was applied on the top plate during the measurements for all the batches. The resistivity and conductivity of the samples were then calculated using equations 3 and 4, respectively.

Self-Sensing Ability

Figure 3:
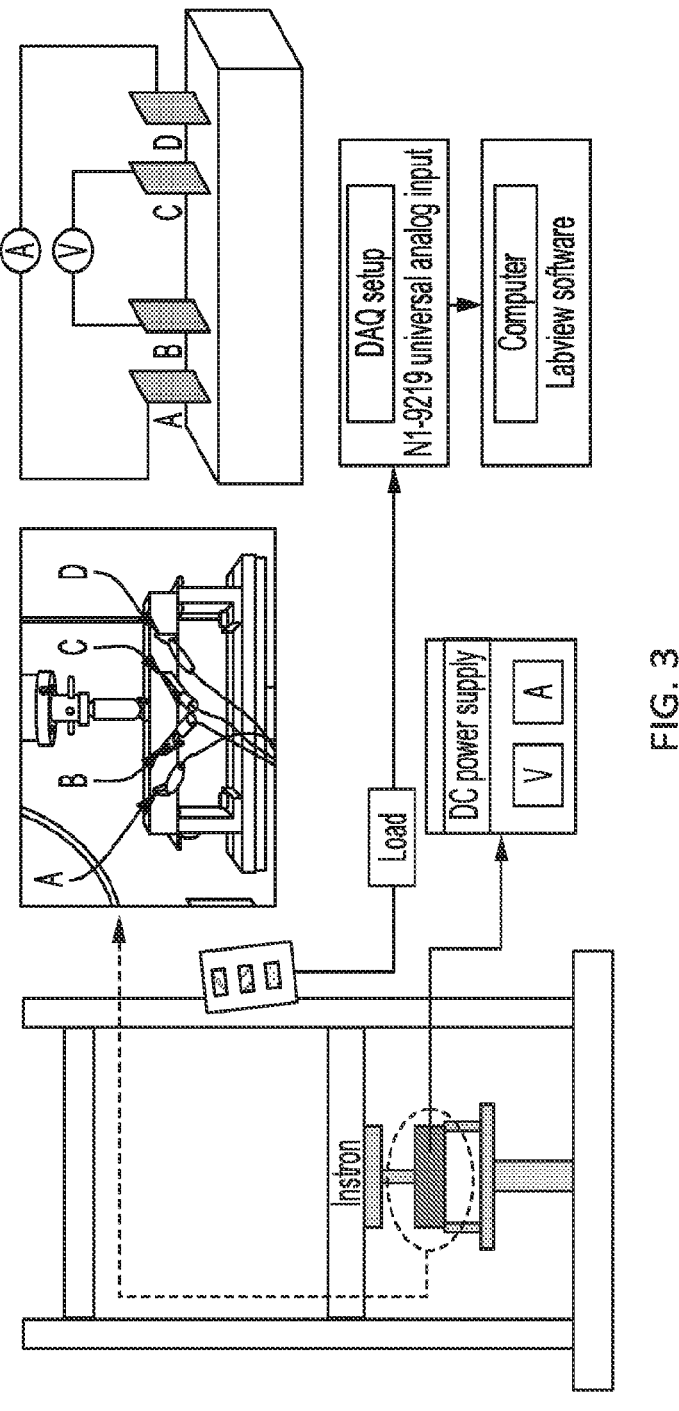
FIG. 3 depicts an exemplary setup for measuring the fractional change in resistivity (FCR) of samples in three-point bending condition.

Self-sensing refers to the ability of a structural material to sense stress, strain, and/or temperature in it without the incorporation of any external sensor. Self-sensitivity tests were performed using mortar beam samples of 40 mm×30 mm×180 mm dimensions. A four-pole Wenner Array setup was prepared for this test using copper plates as shown in FIG. 3. Four copper plates were inserted in the mortar beams during casting at points A, B, C, and D which acted as the poles. The distances of AB, BC, and CD were 30 mm, 60 mm, and 30 mm respectively. The mortar beam was then subjected to a loading rate of 15 N/s and a DC voltage of 20V. A NI-9219 universal analog input module was used as the data logger to record the current flow in the sample. The resistance was measured from the applied voltage and the recorded current flow. The fractional change in resistivity (FCR) was then determined using equation 5, while resistivity was calculated using equation 3.

Relative Embodied Carbon Footprint Comparison

Replacing OPC with modified biochar in cement-based materials reduces total OPC consumption, thus reducing the embodied carbon of the mortar samples. Further, the total carbon content of the used biochar was found to be 80% by weight. Using biochar in mortar or paste samples ensures sequestration of this carbon which cannot get back to the atmosphere. Both factors were considered in order to calculate the relative reduction of the carbon footprint due to the usage of biochar as a partial replacement of OPC.

Results and Discussions

Heat of Hydration

Figures 4A, 4B, 4C, 4D, 4E, 4F:
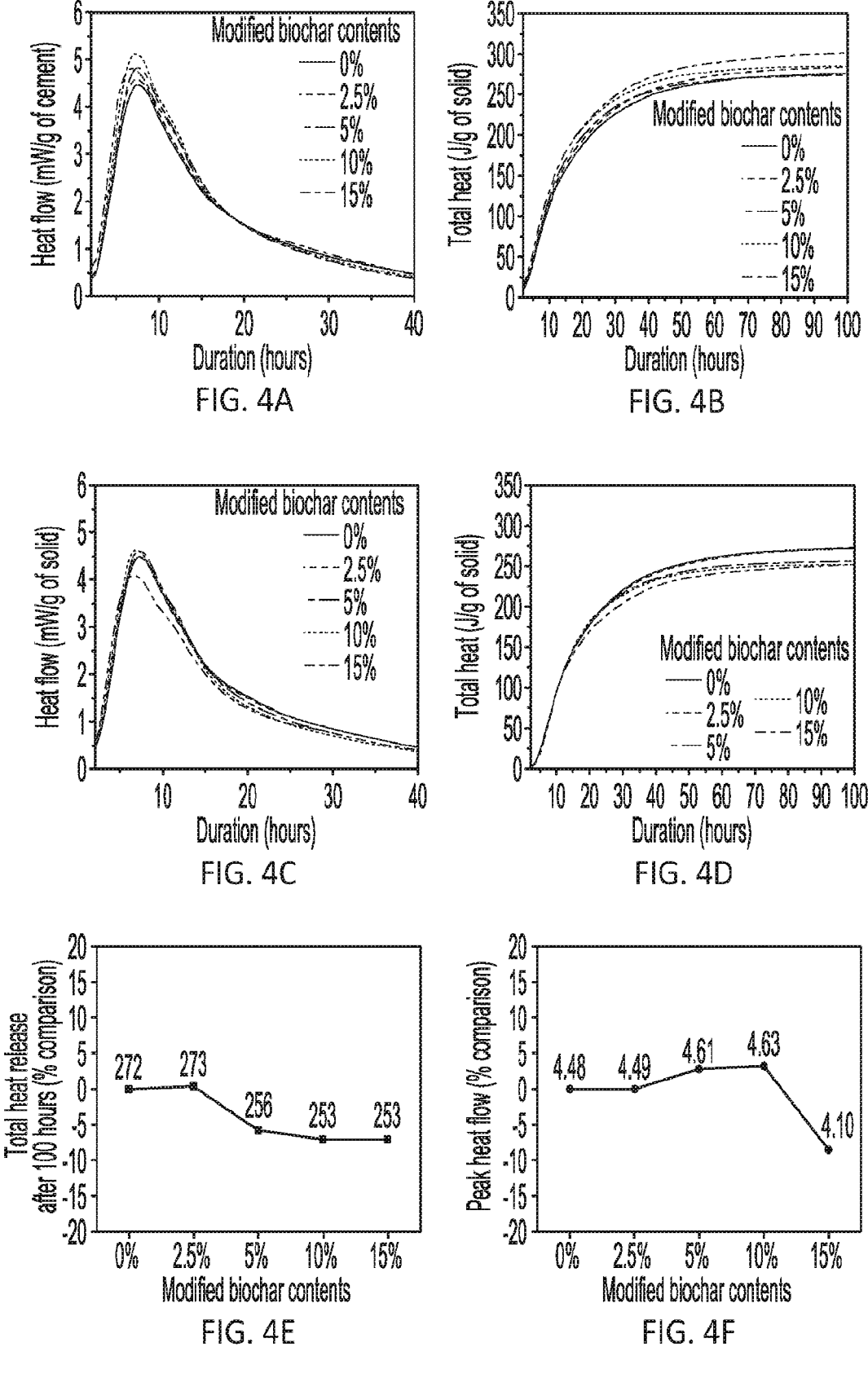
FIG. 4A is a graph showing exemplary heat flow per g of a cement composition (mW/g) as a function of time.
FIG. 4B is a graph showing an exemplary total heat per g of a cement composition (J/g) as a function of time.
FIG. 4C is a graph showing exemplary heat flow per g of both of a cement composition and modified biochar (mW/g) as a function of time.
FIG. 4D is a graph showing an exemplary total heat per g of both of a cement composition and modified biochar (J/g) as a function of time.
FIG. 4E shows an exemplary change in heat flow (mW/g) per g of both of a cement composition and modified biochar after 100 hours of hydration.
FIG. 4F shows an exemplary change in total heat release (J/g) per g of both if a cement composition and modified biochar after 100 hours of hydration.

The heat flow of the paste samples per g of cement and per g of solid are given in FIG. 4A and FIG. 4C, respectively. The main peak of heat flow was associated with the C3S hydration forming C—S—H and Ca(OH)$_2$. From the heat flow plots, it was found that the rate of hydration reaction did not decrease or delay due to the use of modified biochar as partial replacement for the cement. Worth noting, the commercially available permeability reducing admixtures (PRAs) often delay the cement hydration reaction. On the other hand, the modified biochar produced in this Example showed an increase in the peak heat flow per g of cement as shown in FIG. 4A. A higher slope of heat flow at the initial stage also denotes a faster hydration rate due to the addition of modified biochar. Almost a 10% increase was also found in total heat release per g of cement due to the addition of 15% by weight modified biochar content as shown in FIG. 4B. This accelerated hydration was attributed to the nucleation effect (also known as 'filler effect') of modified biochar. As observed in FIG. 2, modified biochar has a finer particle size distribution than OPC. The high surface area of these fine particles provided additional nucleation sites for C—S—H and, therefore, accelerated the cement hydration. Nevertheless, the peak heat flow and total heat release per gm of solid (i.e., total OPC and modified biochar weight) were decreased with the increasing modified biochar content as observed from FIGS. 4C and 4D, respectively. Such a decrease may be due to the reduced amount of cement (reactive ingredient) content per gram of solid. As observed from FIGS. 4E and 4F, this decrease in total heat release or peak heat flow per gram of solid was less than 10%.

Microscopic Phase Evaluation

Figure 5:
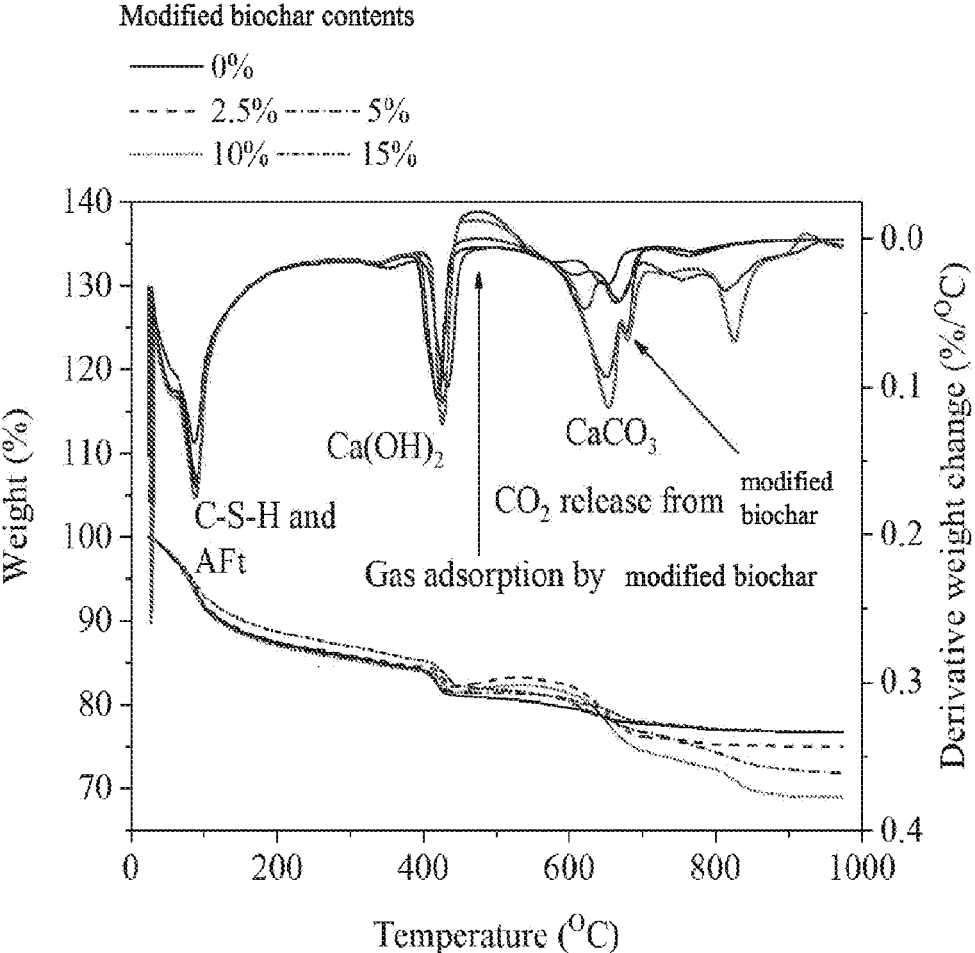
FIG. 5 shows an exemplary thermogravimetric plots of paste samples comprising different amounts of modified biochar.

FIG. 5 shows the typical thermogravimetric analysis (TGA) plots of the cement paste samples with different modified biochar contents. Weight loss due to the decomposition of typical cement hydration products, such as C—S—H gel, ettringite (AFt), and $Ca(OH)_2$ are identified in this figure based on the literature data. In addition to typical cement hydration products, two unusual peaks were observed in the DTG plots at around 500° C. and 700° C. The first additional peak represents an increase in the weight of the samples. This peak may be attributed to the weight increase due to the gas adsorption by biochar particles. The second additional peak may be explained as the release of $CO_2$ from biochar oxidation and decomposition of $CaCO_3$ that might have formed due to the negligible atmospheric carbonation of the paste samples.

Figure 6A:
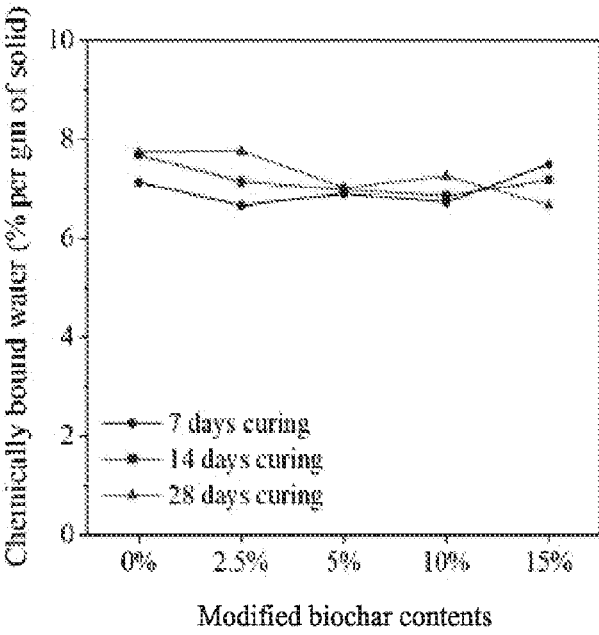
FIG. 6A shows an exemplary graph depicting chemically bound water per gram of both of a cement composition and modified biochar after 7, 14, and 28 days of curing.
Figure 6B:
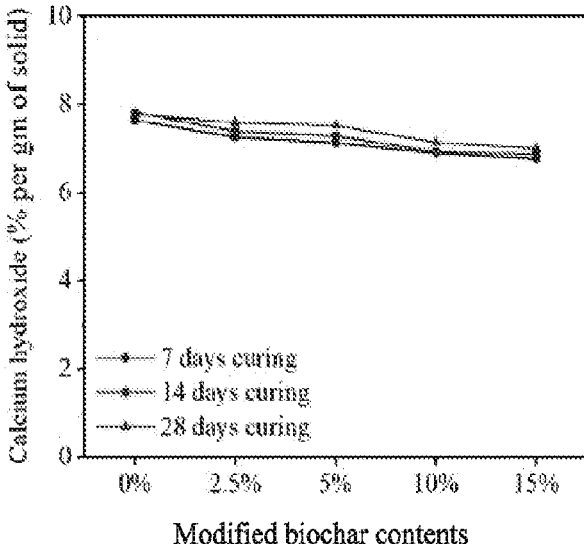
FIG. 6B shows an exemplary graph depicting $Ca(OH)_2$ per gram of both of a cement composition and modified biochar after 7, 14, and 28 days of curing.

The TGA data were further analyzed to determine the amount of $Ca(OH)_2$ and chemically-bound water present in hydrated paste, following the approach published previously. The amounts of chemically bound water were valuable to compare the extent of cement hydration. FIG. 6A shows the amount of chemically bound water per gram of cement with different modified biochar contents. FIG. 6A shows that for 2.5%, 5%, and 10% of cement replacement by modified biochar, the chemically bound water was decreased by 6.5%, 3.2%, and 5.6% after 7 days of curing. On the other hand, 15% of cement replacement by modified biochar increased the chemically bound water by 5% after 7 days of curing, which supports a 10% increase in total heat of hydration (per gm of cement). Accordingly, this result provides further evidence that due to their fineness compared to the cement particle, the modified biochar particles act as seeds that accelerate the cement hydration, i.e., filler effect. However, after longer curing durations (e.g., 14 days and 28 days), the control batch contained higher amounts of chemically bound water compared to the modified biochar batches. The reduction of chemically bound water was only 9% and 15%, respectively, after 14 days and 28 days of curing due to the addition of 10% modified biochar. FIG. 6B shows the calcium hydroxide variation with different modified biochar contents. The relative amounts of $Ca(OH)_2$ decreased with increasing modified biochar content. This trend may have resulted because the amounts of OPC also decreased with increasing modified biochar contents. Nevertheless, the reductions of $Ca(OH)_2$ were around 10%, indicating such an effect of modified biochar on hydration products are insignificant.

ATR/FTIR Spectra of Modified Biochar and Cement Paste

Figure 7A:
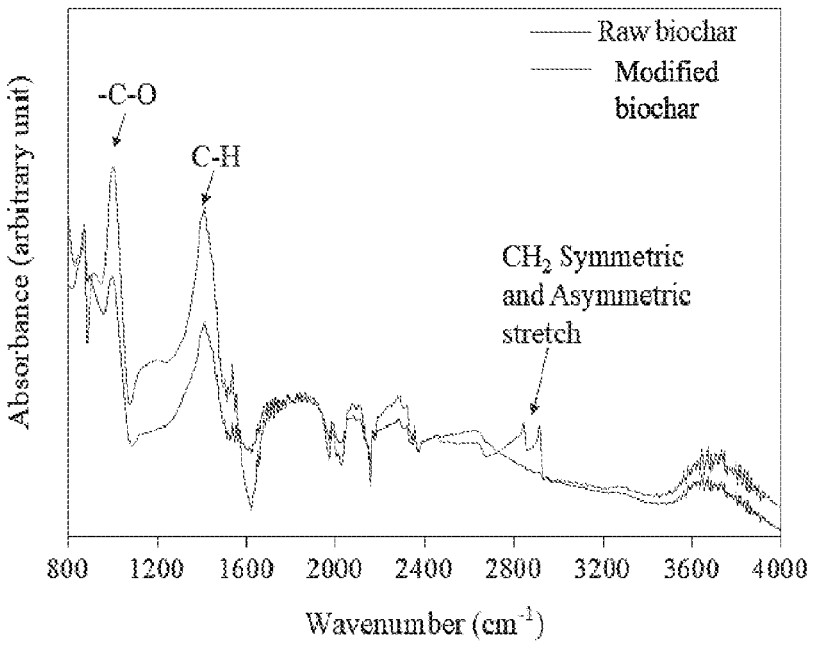
FIG. 7A shows an exemplary Fourier-transform infrared spectroscopy (FTIR) spectra of unmodified biochar and modified biochar.

FIG. 7A shows the comparison of raw biochar and modified biochar. The wide peak at around 3600 $cm^{-1}$ was due to hydroxyl groups. The peaks at around 2925 and 2850 $cm^{-1}$ of modified biochar were asymmetric and symmetric alkyl C—H groups respectively. Those peaks were absent in raw biochar. C=C stretching vibration of aromatic groups at around 1600 $cm^{-1}$ was intense in modified biochar. At around 1000 $cm^{-1}$, the asymmetric stretch of the C—C—O carbonyl groups was intense with modified biochar compared to the raw biochar. The small weak peaks in the 1463-2000 $cm^{-1}$ and 3500-3900 $cm^{-1}$ range may be caused by carbonates produced due to biochar and $CO_2$ reactions in the presence of moisture.

Figure 7B:
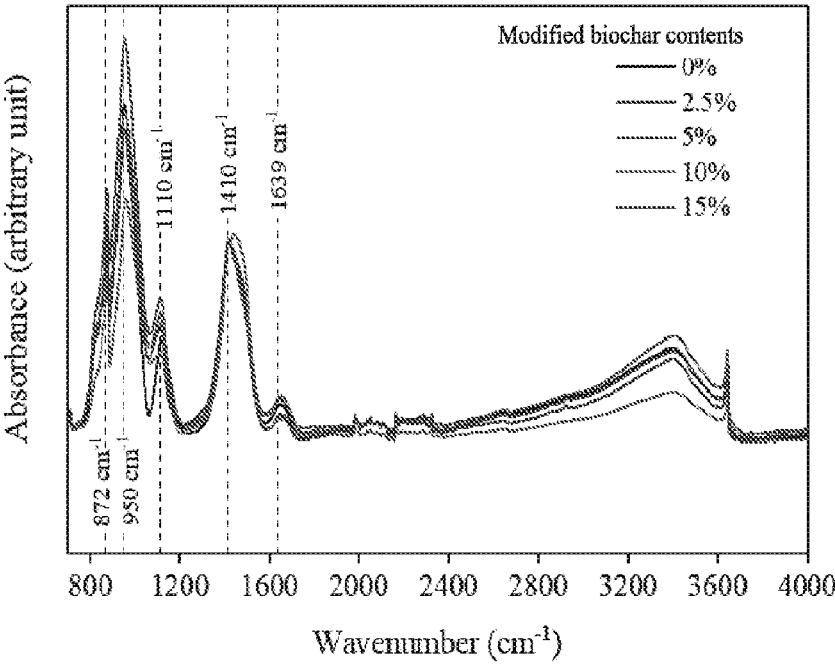
FIG. 7B shows an exemplary FTIR spectra of compositions comprising a cement composition and modified biochar after 28 days of hydration.

FIG. 7B shows the effects of biochar inclusion in the cementitious matrix. The wavenumbers at around 872 $cm^{-1}$ and 1410 $cm^{-1}$ were due to out of plan bending vibration of $CO3^{2-}$ and asymmetric vibration of $CO_3^{2-}$ respectively. The bending peak at 1639 $cm^{-1}$ was due to chemical bound water and $Ca(OH)_2$. The FTIR plots postulated that, due to the inclusion of biochar, the hydration reaction product did not change. The CSH gel band can be found at 950 $cm^{-1}$. The shifting of silica gel polymerization to higher wave number (1100 $cm^{-1}$) were also same for all batch. Most of the biochar peaks were overlapped with the cementitious reaction products.

Workability

Figure 8:
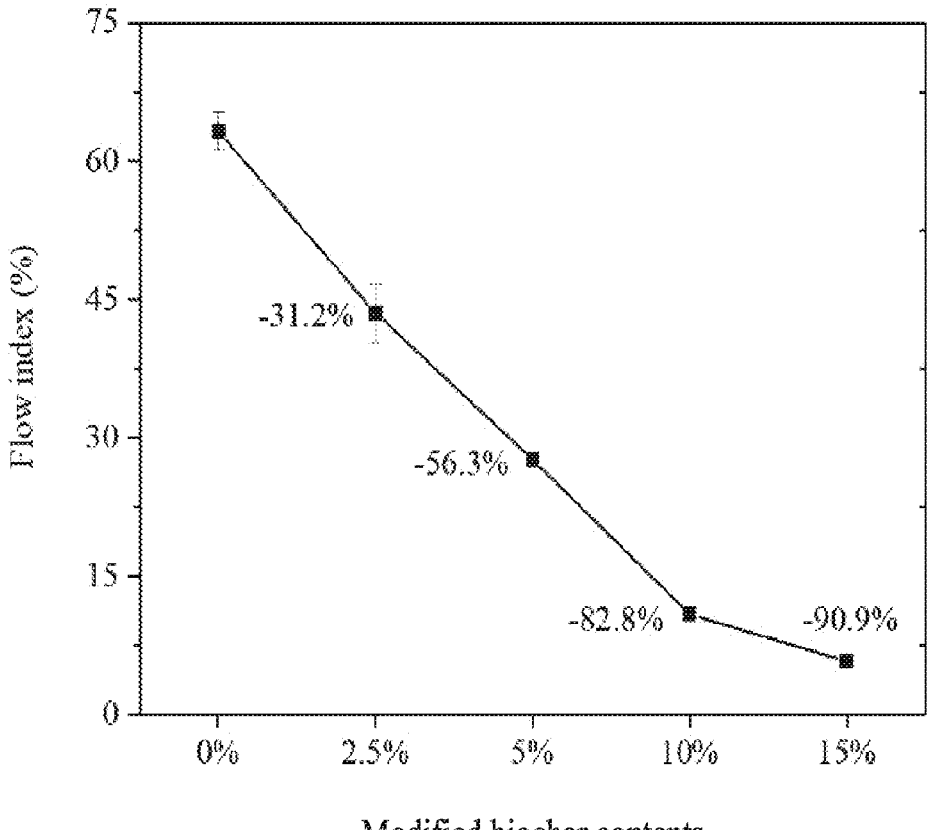
FIG. 8 is a graph showing exemplary flow indices of compositions with different modified biochar contents. Data labels show the percentage reduction of flow index due to the addition of modified biochar. Error bars represent one standard deviation.

The effects of modified biochar on the workability of the mortar samples were determined using the flow table test. The flow indices of the mortar samples as shown in FIG. 8 were found to decrease with increasing modified biochar contents. It was found that the flow index of the 15% modified biochar batch was 90% lower compared to the control batch. The percent decreases for the other batches were around 30%, 56%, and 83%, respectively, for 2.5%, 5% and 10% by weight of modified biochar contents. This decrease in workability due to the addition of modified biochar may be attributed to two aspects. First, the particle size of modified biochar is smaller than that of OPC. Thus, the replacement of OPC with modified biochar may have resulted in an increase of the specific surface area of the mixture. High surface area may have increased the friction level leading to a lower workability. Secondly, due to the hydrophobicity, the modified biochar particle may have repulsed water molecules. Such a repulsive force may have contributed to the decreased workability of the mortar mixture.

Compressive and Flexural Strengths

Figure 9A:
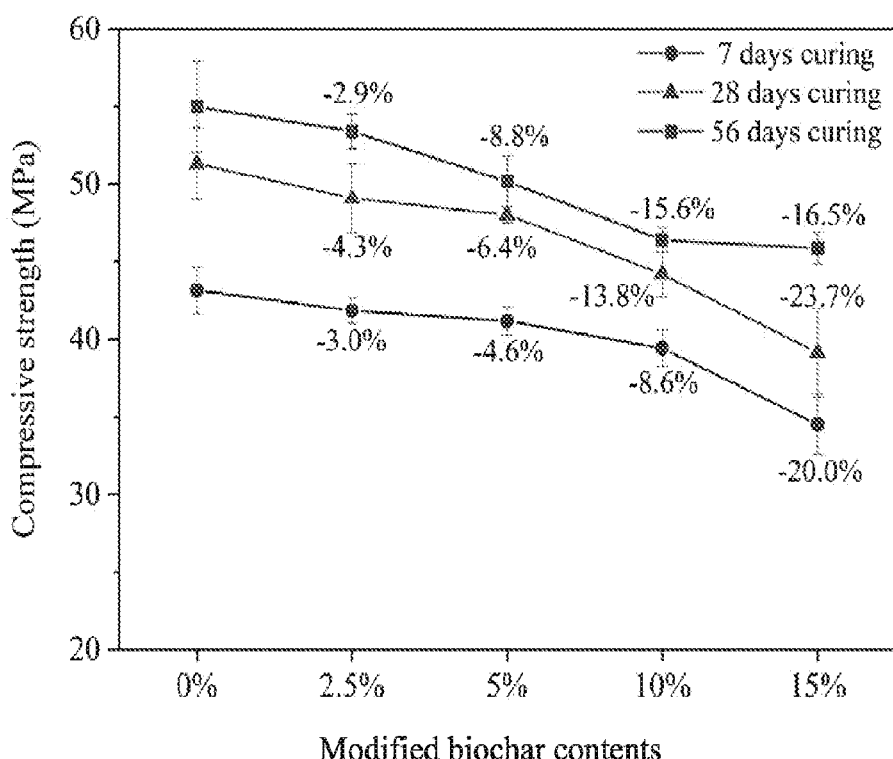
FIG. 9A is a graph depicting compressive strengths of exemplary compositions with different modified biochar contents.
Figure 9B:
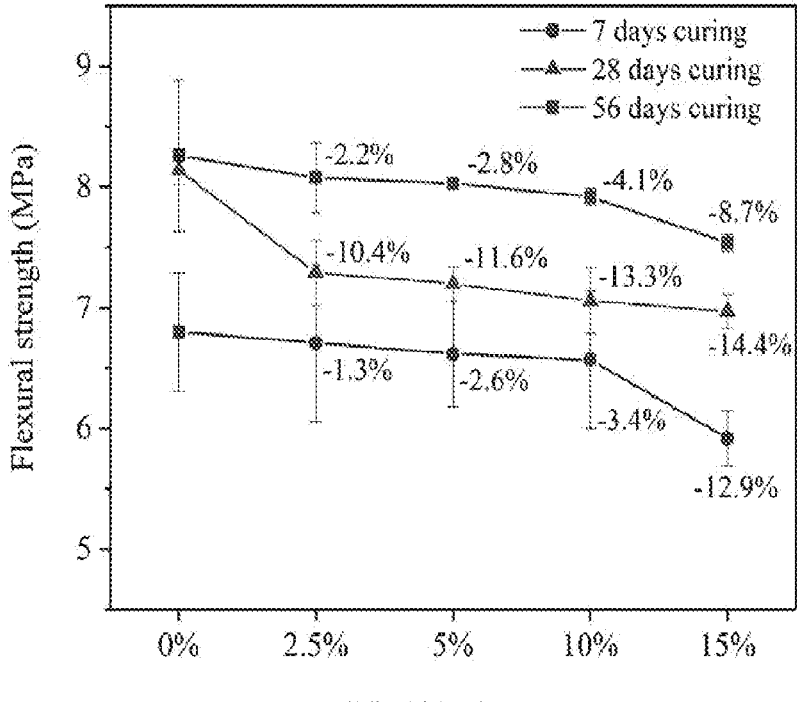
FIG. 9B is a graph depicting flexural strengths of exemplary compositions with different modified biochar contents. Data labels show the percentage variation in strengths with respect to the control batch (e.g., no modified biochar) due to the addition of modified biochar. Error bars represent one standard deviation.
Figure 10A:
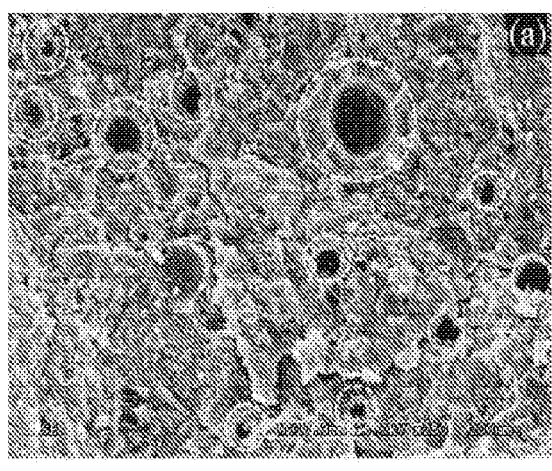
FIGS. 10A-10C are exemplary SEM images at different magnification levels showing a composition comprising a cement composition and modified biochar.
Figure 10B:
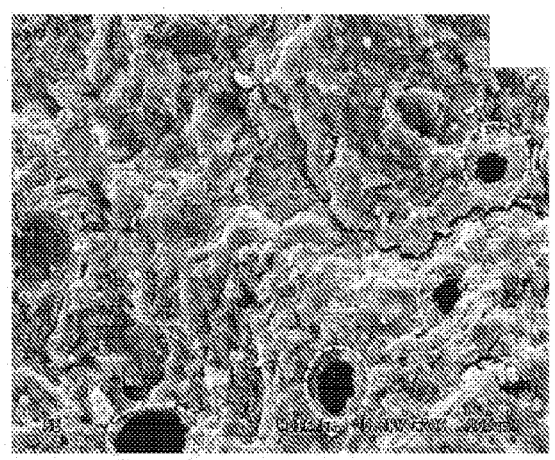
Figure 10C:
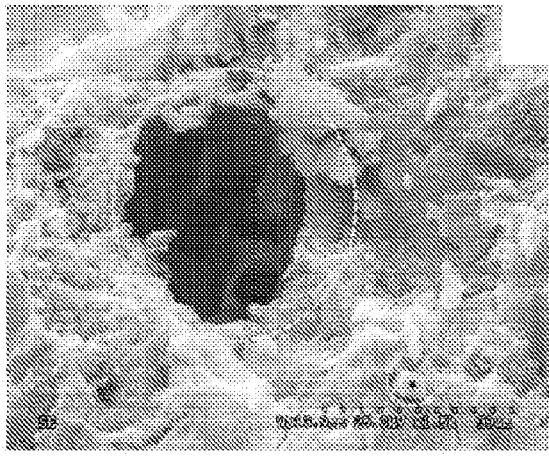

The compressive strengths of the mortar samples were found to decrease with an increase in the modified biochar contents in the mixture, as shown in FIG. 9A. Such reduction in compressive strength may be caused because of the inert nature of the modified biochar. The compressive strength of the control batch was found to be 43 MPa after 7 days of sealed curing. The decreases in compressive strength were 3.0%, 4.6%, 8.6% and 20.0% due to the addition of 2.5%, 5%, 10% and 15% modified biochar contents, respectively. These reduction levels became 2.9%, 8.8%, 15.6%, and 16.5%, respectively, after 56 days of curing. The trend was similar for the flexural strengths of the mortar beams containing modified biochar as partial replacement for OPC as shown in FIG. 9B. After 28 days of hydration, the flexural strengths of the samples were decreased by 10.4%, 11.6%, 13.3%, and 14.4% due to the addition of 2.5%, 5%, 10%, and 15% modified biochar contents, respectively. The reduction in strength due to the addition of modified biochar may be explained by two mechanisms; (i) inert nature of modified biochar and (ii) increased porosity. Due to the inert nature of modified biochar, replacing cement with this material reduced the relative amount of binding phases in hydrated paste and mortar systems compare to the control batch. Specifically, it was observed from TGA plots as shown in FIGS. 6A and 6B that the addition of modified biochar reduced both amounts of $Ca(OH)_2$ and C—S—H per gram, which are the primary binding phases. Therefore, this reduced relative amount of binding phases may have led to reduced strength in the case of modified biochar containing mortar batches. Further, biochar particles generally have higher porosity, which can increase the total porosity of the cement paste. The SEM images of the cement paste with 15% modified biochar after 28 days of curing are given in FIGS. 10A-10C. As it can be observed from these figures, the addition of modified biochar introduced organized porosity in the cement paste matrix. Further, the cell structure of wood was also visible in some of the pores as shown in FIG. 10C.

The compressive and flexural strength results were analyzed using the two-sample t-test statistical method to identify the significant effects of adding modified biochar. The mean and standard deviation of compressive strength for different cement replacement levels and after different curing durations were compared. The test was performed with a 95% confidence level. Therefore, from the statistical analysis, p-values greater than 0.05 indicated that there is no significant variation in the compared mean strengths, vice versa.

From Table 1, it can be observed that the addition of 2.5% modified biochar does not have any significant effect on the compressive strength of the mortar. On the other hand, the effects of 5% modified biochar on the compressive strength remained insignificant until 28 days of curing age. After 56 days of curing, additions of modified biochar more than 2.5% significantly decreases the compressive strengths of the mortar batches. Conversely, after the same curing duration, additions of up to 10% modified biochar do not significantly affect the flexural strengths of the mortar batches. Therefore, the detrimental effect of modified biochar addition was more pronounced in the case of the compressive strength compared to the flexural strength.

TABLE 1

| Statistical (t-test) analysis results (p-values) of compressive and flexural strength. | | | | | |
|---|---|---|---|---|---|
| Modified biochar contents | Compressive strength Curing | | | Flexural strength Curing | | |
| | 7 days | 28 days | 56 days | 7 days | 28 days | 56 days |
| 0% | — | — | — | — | — | — |
| 2.5% | 0.14522 | 0.1469656 | 0.224397 | 0.43318 | 0.00945 | 0.28482 |
| 5% | 0.430477 | 0.2631451 | 0.052011 | 0.38327 | 0.00977 | 0.17188 |
| 10% | 0.01601 | 0.0073399 | 0.01486 | 0.35886 | 0.00557 | 0.11997 |
| 15% | 0.002388 | 0.0026309 | 0.011467 | 0.05778 | 0.00509 | 0.03213 |

*Note:
Bold fonts represent (p-values > 0.05) that the data are not statistically significant Water Absorption The water absorptions by the mortar samples with exposure durations are given in FIG. 11A. The addition of modified biochar decreased the water absorption of the mortar samples. After the full exposure duration, the total water absorbed by the sample containing 15% modified biochar was 68% lower than the control batch. This water absorption data was further used to calculate the initial and secondary rates of water absorption by the mortar samples as shown in FIGS. 11B and 11C. In both cases, the 15% modified biochar batch showed the lowest level of water absorption rate. The reduction of the initial and secondary water absorption rates due to the use of 15% modified biochar were around 70% and 60%, respectively. The decrease in water absorption rate due to the addition of modified biochar may have been attributed to the fine particle size of modified biochar and the hydrophobic nature of these particles. Therefore, it appears that modified biochar acted as a hydrophobic pore-blocking additive in these mortar samples to reduce the moisture permeability.

Electrical Conductivity

Figure 12:
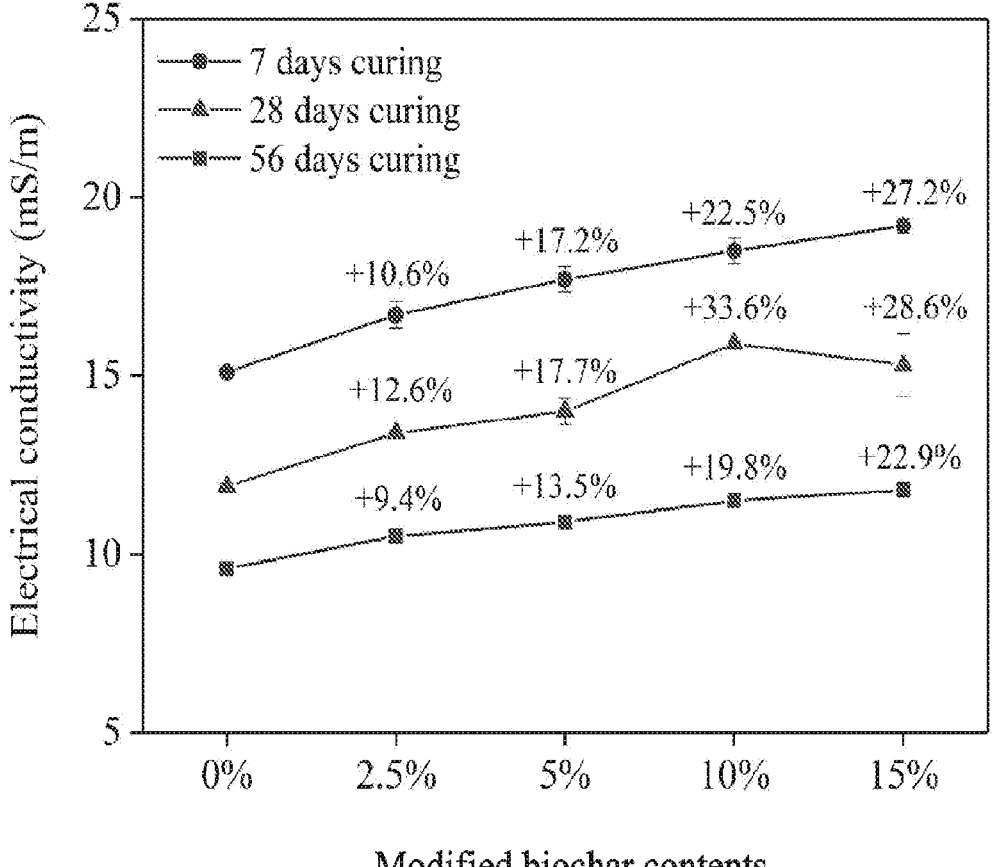
FIG. 12 is a graph showing electrical conductivity of an exemplary composition comprising various modified biochar contents. Error bars represent one standard deviation.

The electrical conductivities of the mortar samples containing modified biochar were obtained using the two-pole method. As shown in FIG. 12, the increase in the biochar content increased the electrical conductivity of the mortar samples. After 28 days of hydration, the electrical conductivity was increased by 28% due to the addition of 15% (by weight) modified biochar, compared to that of the control batch. This may be because the biochar has a high carbon content that acted as conductive inclusions in the matrix. Previous studies mostly utilized carbon fibers to enhance the electrical conductivity of cement-based composites. A. Belli, et al., "Evaluating the self-sensing ability of cement mortars manufactured with graphene nanoplatelets, virgin or recycled carbon fibers through piezoresistivity tests," Sustain., vol. 10, no. 11, 2018. The carbon content in the carbon fibers ranges from 95%-100%. F. Rajabipour, et al. "Electrical conductivity of drying cement paste," Mater. Struct. Constr., 2007. The high aspect ratio of carbon fiber also enhances conductivity by creating a uniform network. Although modified biochar contains a lesser amount of carbon with lower aspect ratios, the addition of this material also successfully ensured higher electrical conductivity of the mortar samples, as observed in this experiment. This may be because the previous studies content used in the matrix was significantly higher (up to 15% by weight) compared to the usual dosage of carbon nanofibers (around 1%) that are used in the cementitious matrix. The dosages of carbon nanofibers are generally limited because of high cost, poor dispersibility and its negative effects on the workability of the cementitious composites. Such drawbacks can be avoided in the case of previous studies. As such, previous studies used higher dosage (15% in this study) to produce similar electrical conductivity of cementitious composites as those achieved using carbon nanomaterials.

The conductivities of the mortar batches were observed to decrease with increasing curing duration. The electrical resistivity and conductivity of the cement-based materials are also affected by the porosity and pore solutions; with higher porosity, the electrical resistivity tends to be lower. The cement degree of hydration was increased with increasing curing duration that results in pore refinement due to the formation of hydration products. Accordingly, the pore blockage resulting from these hydration products causes a decrease in conductivity of the mortar samples with extended curing durations, as observed in FIG. 12. The electrical conductivity results were analyzed using the two-sample t-test statistical method to identify the significance of adding modified biochar. As observed from Table 2, addition of modified biochar significantly increases the electrical conductivity of the mortars, irrespective of the dosages used.

TABLE 2

| | Statistical (t-test) analysis results (p-values) of electrical conductivity | | |
|---|---|---|---|
| Modified biochar | Electrical conductivity (curing age) | | |
| contents | 7 days | 28 days | 56 days |
| 0% | — | — | — |
| 2.5% | 0.008040619 | 1.6534E−05 | 6.41228E−05 |
| 5% | 0.002604569 | 0.00400493 | 0.001417421 |
| 10% | 0.001463104 | 1.40299E−07 | 1.64522E−05 |
| 15% | 9.04023E−05 | 0.010616965 | 0.000301359 |

Self-Sensing Ability

Figure 13A:
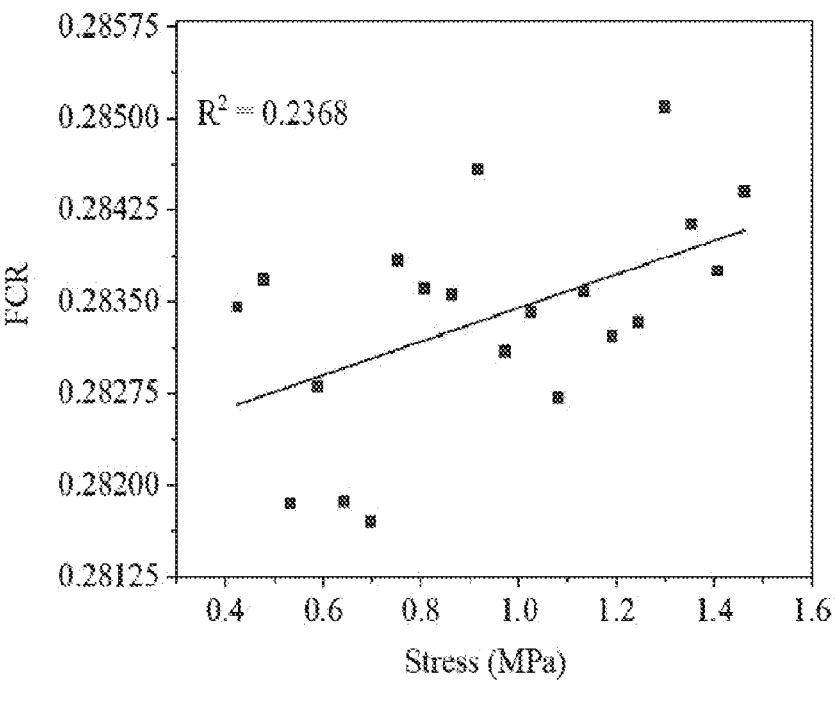
FIGS. 13A and 13B are graphs showing fractional change in resistivity (FCR) for a composition comprising 0% modified biochar (i.e., control batch), and a composition with 15% modified biochar, respectively.
Figure 13B:
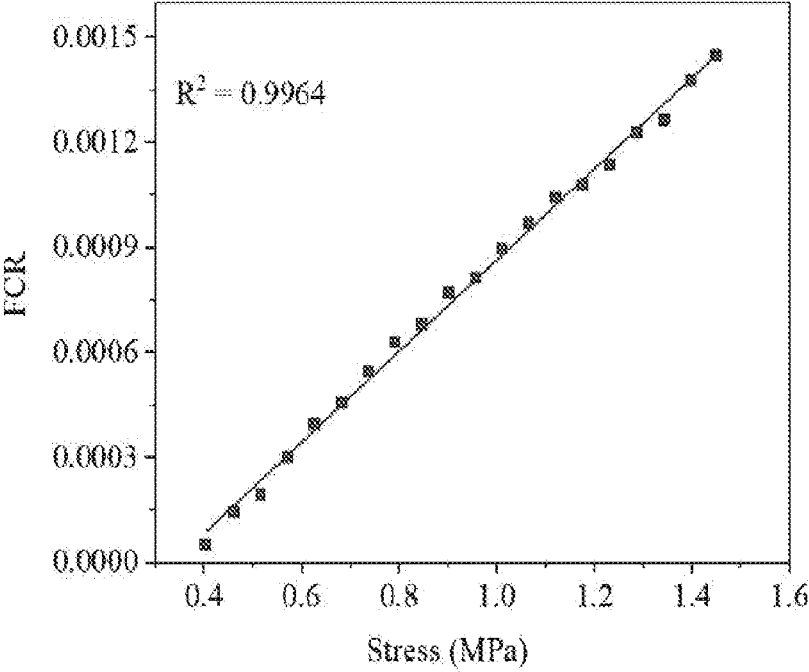

Self-sensing cementitious composites enable the determination of the stress and strain in the matrix by measuring the fractional change in resistivity (FCR). In this experiment, the FCR of the mortar beam samples was measured when these were subjected to three-point bending conditions. A good correlation between the stress levels and FCR indicates a strong self-sensing ability of the composites. The correlation between FCR and stress was evaluated by comparing the coefficients of determination (commonly known as $R^2$ value). FIGS. 13A-B show the correlation between stress and FCR for two sample batches. It can be observed that in the case of the control batch, the FCR and stress data points appeared to be scattered and there is no direct correlation (low $R^2$ value) between these values, thereby confirming the poor self-sensing ability of the hydrated OPC mortar (control batch) without any conductive additive. Nevertheless, after the addition of 15% modified biochar, the variation in stress and FCR showed a strong linear correlation, with the $R^2$ value close to 1. Accordingly, for this batch stress can be determined by measuring the resistivity (i.e., FCR) and therefore, the addition of modified biochar evidently enhanced the self-sensing ability of this mortar batch. Such correlations were verified for all the mortar batches and the obtained $R^2$ values are given in Table 3. As it can be observed, a high $R^2$ value (more than 0.9) was obtained even with 2.5% modified biochar content. These findings indicate that biochar can be an alternative to high-cost carbon nanomaterials for producing cement-based materials with high electrical conductivity that can be used as a self-sensing composite.

TABLE 3

| | $R^2$ values representing the correlations between FCR values and stress for mortar batches with different modified biochar contents | | | | |
|---|---|---|---|---|---|
| | Modified biochar Content | | | | |
| | 0% | 2.5% | 5% | 10% | 15% |
| R-Square Value | 0.2368 | 0.9905 | 0.8860 | 0.9960 | 0.9964 |

Relative Embodied Carbon

Figure 14A:
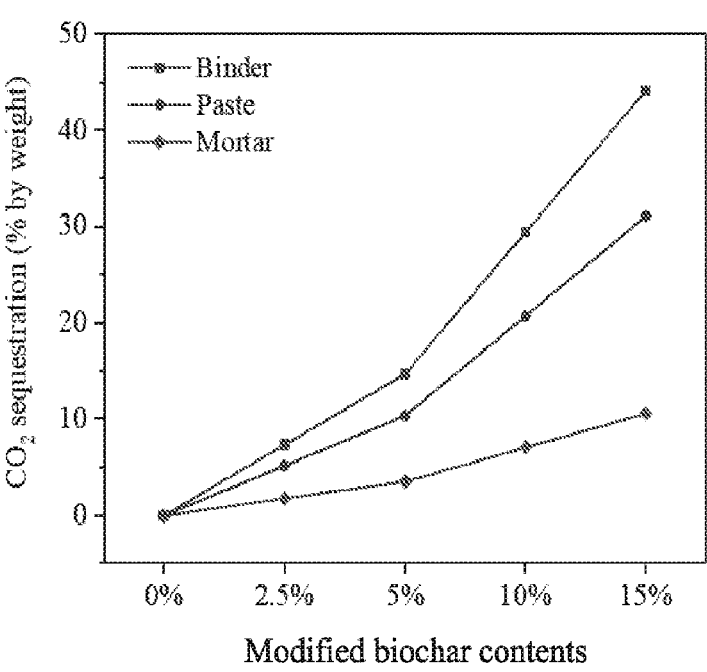
FIGS. 14A and 14B show exemplary $CO_2$ sequestration/reduction of cement-based materials with the application of modified biochar as partial replacement of cement.
Figure 14B:
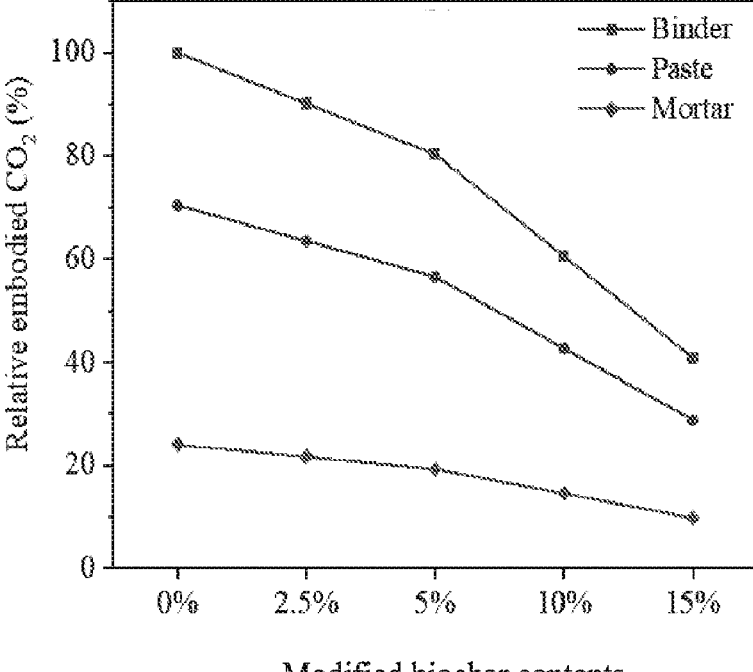

Modified biochar can help to reduce the embodied carbon of cementitious composites by reducing the amount of OPC used to prepare these samples and by sequestrating the carbon present in the biochar. The average fixed carbon content of the biochar was 80.22% by weight as per the CHN results. The fixed carbon was then used to calculate the equivalent $CO_2$ amount stored in the samples due to the addition of biochar. As observed from FIG. 14A, addition of around 15% modified biochar equivalents to around 30% by weight of $CO_2$ sequestration in cement paste. Next, a simplified embodied carbon (eCO$_2$) of the binder mix (cement+ modified biochar) was calculated, considering the control batch as the baseline. The embodied carbon of stearic acid was ignored, considering only a small amount of this ingredient used to produce modified biochar. The relative embodied carbons (eCO2) of the binder mix, calculated as per this approach, are given in FIG. 14B. Based on this approach, replacing 2.5%, 5%, 10%, and 15% by weight of cement with modified biochar can reduce the embodied $CO_2$ of the binder mix (i.e., OPC+modified biochar) by 10%, 20%, 39%, and 59%, respectively, compared to the control batch. This reduction in embodied carbon due to the addition of 15% modified biochar is translated to be 29% and 10% reduction for paste and mortar samples, respective. Accordingly, these findings indicate that it is possible to produce cementitious composites with a relatively lower carbon footprint using modified biochar as a partial replacement of cement.

Environmental Significance

The development of environmentally friendly and durable cementitious composites for a sustainable future is of immense importance. Specifically, considering the high carbon footprint and energy-intensive production of OPC, ways to reduce the consumption of this cement can effectively contribute towards the sustainability of civil infrastructures. This Example showed that biochar, a relatively low-cost additive, can play a significant role in this case. One of the surprising findings of this work was the relative amounts of $CO_2$ sequestration in cementitious composites using biochar. Additionally, this Example also provided experimental evidence that modified biochar can be used to significantly (up to 70%) reduce the water absorption of mortar. Therefore, provided compositions can potentially be used to significantly improve the durability performances of cement-based materials, specifically those pertaining to the penetration of dissolved ions in the matrix, including chloride and sulfate salt penetrations. This durable matrix can lead to the increased service life of structural components produced using biochar, and subsequently, further reduction of the cement consumption over a long period. Because of the high carbon content of biochar, modified biochar can also be used as a conductive inclusion to produce electrically conductive cementitious composites and these composites can be further used as self-sensing structural elements. However, the addition of modified biochar can negatively affect the compressive and flexural strengths of the mortar samples. Even though the strengths were decreased, the addition of modified biochar successfully introduced multifunctionality in cementitious compositions including low water absorption, high electrical conductivity, and low carbon footprint. Accordingly, this reduction in strength can be overcome by adjusting the mix proportions (i.e., lowering w/c or using supplementary cementitious materials) when multifunctionality is the desired performance.

EQUIVALENTS

Those skilled in the art will recognize, or be able to ascertain using no more than routine experimentation, many equivalents to the specific embodiments of the invention described herein. The scope of the present invention is not intended to be limited to the above Description, but rather is as set forth in the following claims:

What is claimed is:
1. A composition comprising:
at least one cement composition; and
a modified biochar comprising a hydrophobic agent, wherein the hydrophobic agent is selected from the group consisting of stearic acid, oleic acid, myristic acid and combinations thereof, wherein the biochar is within the range of 1 weight % to 30 weight % of a combination of the cement composition and the modified biochar, wherein the mean size of the modified biochar is within a range of 1 to 50 μm, wherein the mean size of the cement composition is within a range of 1 to 50 μm, and wherein the composition is piezoresistive.

2. The composition of claim 1, the modified biochar is more hydrophobic than the biochar.

3. The composition of claim 1, wherein a mass ratio of the hydrophobic agent to the biochar is within a range of about 1:100 to 1:10.

4. The composition of claim 1, further comprising water.

5. The composition of claim 4, wherein a mass ratio of the water to a combination of the cement composition and the modified biochar is about 0.25 to 0.8.

6. The composition of claim 1, further comprising a fine aggregate.

7. The composition of claim 6, wherein a mass ratio of a combination of the cement composition and the modified biochar to the fine aggregate is about 2 to 3.

8. The composition of claim 1, wherein the composition has a compressive strength lower than the cement composition.

9. The composition of claim 1, wherein the composition has a flexural strength lower than the cement composition.

10. The composition of claim 1, wherein the composition has a heat release higher than the cement composition.

11. The composition of claim 1, wherein the composition comprises chemically bound water less than the cement composition.

12. The composition of claim 1, wherein the composition comprises less $Ca(OH)_2$ than the cement composition.

13. The composition of claim 1, wherein the composition has a flow index lower than the cement composition.

14. The composition of claim 1, wherein the composition has a water absorption rate lower than the cement composition.

15. The composition of claim 1, wherein the composition has an electric conductivity higher than the cement composition.

16. A mortar for use in construction, wherein the mortar comprises:

at least one cement composition;

a modified biochar comprising a biochar and a hydrophobic agent, wherein the hydrophobic agent comprises stearic acid, wherein the modified biochar comprises from about 2 weight % to about 20 weight % of the hydrophobic agent, wherein a mean size of the modified biochar is within a range of 1 to 50 μm, wherein the modified biochar comprises from about 1 weight % to about 10 weight % of the total weight of a combination of the at least one cement composition and the modified biochar; and water, wherein the mortar is characterized in that the composition is piezoresistive, wherein the composition is characterized in that the composition has a 1% to 90% lower water absorption rate than the at least one cement composition.

* * * * *